(12) United States Patent
Kim et al.

(10) Patent No.: US 10,063,476 B2
(45) Date of Patent: Aug. 28, 2018

(54) CONTENT CENTRIC NETWORKING SYSTEM PROVIDING DIFFERENTIATED SERVICE AND METHOD OF CONTROLLING DATA TRAFFIC IN CONTENT CENTRIC NETWORKING PROVIDING DIFFERENTIATED SERVICE

(71) Applicant: RESEARCH & BUSINESS FOUNDATION SUNGKYUNKWAN UNIVERSITY, Suwon-si (KR)

(72) Inventors: Yusung Kim, Suwon-si (KR); Younghoon Kim, Seoul (KR); Ikjun Yeom, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 159 days.

(21) Appl. No.: 14/660,411

(22) Filed: Mar. 17, 2015

(65) Prior Publication Data
US 2015/0281083 A1    Oct. 1, 2015

(30) Foreign Application Priority Data

Mar. 28, 2014 (KR) .................. 10-2014-0036529
Mar. 28, 2014 (KR) .................. 10-2014-0036531

(51) Int. Cl.
*H04L 12/743*   (2013.01)

(52) U.S. Cl.
CPC ................. *H04L 45/7457* (2013.01)

(58) Field of Classification Search
CPC . H04L 41/5022; H04L 43/0894; H04L 45/00; H04L 45/302; H04L 45/7457; H04L 47/10; H04L 47/20; H04L 47/24; H04L 47/2416; H04L 47/2441; H04L 47/31; H04L 47/6215; H04L 69/22; H04L 45/306; H04L 45/74; H04L 45/7453; H04L 45/748; H04L 65/4084; H04L 67/32; H04N 7/17318; H04N 21/20; H04N 21/2225; H04N 21/231; H04N 21/234; H04N 21/2393; H04N 21/2541; H04N 21/25435;
(Continued)

(56) References Cited

U.S. PATENT DOCUMENTS

| | | | |
|---|---|---|---|
| 6,222,841 B1 * | 4/2001 | Taniguchi | H04L 47/10 370/230 |
| 7,715,394 B2 * | 5/2010 | Six | H04L 12/18 370/392 |

(Continued)

*Primary Examiner* — Eric Nowlin
(74) *Attorney, Agent, or Firm* — NSIP Law

(57) ABSTRACT

There is provided a content centric networking system providing a differentiated service that includes a client device that creates an interest packet, an edge router directly connected to the client device in the content centric networking system, that determines a traffic class for an interest packet on the basis of the information included in an interest packet received from the client device, and marks the determined traffic class information in association with the interest packet; and a differentiated service router, which when receiving the interest packet added with the traffic class information, stores the traffic class information in a pending interest table (PIT) and differentially transmits the data requested by the interest packet in accordance with the traffic class information.

20 Claims, 12 Drawing Sheets

Data packet according to traffic class information differentially transmitted

---▶ Interest packet
——▶ Data packet

(58) Field of Classification Search
CPC .......... H04N 21/266; H04N 21/2665; H04N 21/26283; H04N 21/4147; H04N 21/437; H04N 21/4622; H04N 21/4627; H04N 21/43; H04N 21/47202; H04N 21/47211; H04N 21/47217; H04N 21/4722; H04N 21/4782; H04N 21/482; H04N 21/6125; H04N 21/6175; H04N 21/6373; H04N 21/647; H04N 21/64792; H04N 21/84; H04N 21/858

See application file for complete search history.

(56) References Cited

U.S. PATENT DOCUMENTS

| | | | | |
|---|---|---|---|---|
| 7,801,796 | B2* | 9/2010 | Friedman | G06Q 40/06 |
| | | | | 705/37 |
| 8,174,988 | B1* | 5/2012 | Rogers | H04L 65/4084 |
| | | | | 370/237 |
| 8,204,060 | B2* | 6/2012 | Jacobson | H04L 45/748 |
| | | | | 370/392 |
| 8,204,082 | B2* | 6/2012 | Jungck | H04L 29/12066 |
| | | | | 370/230 |
| 8,244,881 | B2* | 8/2012 | Thornton | H04L 67/1023 |
| | | | | 709/201 |
| 8,300,893 | B2* | 10/2012 | Deng | G06K 9/00711 |
| | | | | 348/157 |
| 8,375,436 | B2* | 2/2013 | Thornton | H04L 67/327 |
| | | | | 726/11 |
| 8,576,881 | B2* | 11/2013 | Jungck | H04L 29/12066 |
| | | | | 370/230 |
| 8,638,789 | B1* | 1/2014 | Pani | H04L 45/16 |
| | | | | 370/390 |
| 8,644,211 | B2* | 2/2014 | Jacobson | H04L 12/10 |
| | | | | 370/318 |
| 8,667,172 | B2* | 3/2014 | Ravindran | H04L 12/6418 |
| | | | | 370/228 |
| 8,694,675 | B2* | 4/2014 | Wang | H04L 67/327 |
| | | | | 709/206 |
| 8,751,664 | B2* | 6/2014 | Jacobson | H04L 29/12613 |
| | | | | 709/219 |
| 8,756,297 | B2* | 6/2014 | Jacobson | H04L 61/1582 |
| | | | | 709/219 |
| 8,923,293 | B2* | 12/2014 | Jacobson | H04L 45/745 |
| | | | | 370/392 |
| 8,996,626 | B2* | 3/2015 | Lee | H04L 67/2838 |
| | | | | 709/206 |
| 9,002,921 | B2* | 4/2015 | Westphal | H04L 67/06 |
| | | | | 709/202 |
| 9,013,990 | B2* | 4/2015 | Lee | H04L 47/127 |
| | | | | 370/231 |
| 9,014,001 | B2* | 4/2015 | Hong | H04L 67/327 |
| | | | | 370/236 |
| 9,049,251 | B2* | 6/2015 | Ravindran | H04L 67/327 |
| RE45,661 | E* | 9/2015 | Knight | G06Q 10/10 |
| 9,130,887 | B2* | 9/2015 | Mosko | H04L 45/7457 |
| 9,137,152 | B2* | 9/2015 | Xie | H04L 45/44 |
| 9,147,051 | B2* | 9/2015 | Mahadevan | G06F 21/10 |
| 9,178,916 | B2* | 11/2015 | Mosko | H04L 65/1096 |
| 9,185,120 | B2* | 11/2015 | Mahadevan | H04L 63/1408 |
| 9,191,459 | B2* | 11/2015 | Ravindran | H04L 67/327 |
| 9,203,885 | B2* | 12/2015 | Mosko | H04L 63/164 |
| 9,253,087 | B2* | 2/2016 | Zhang | H04L 45/74 |
| 9,253,091 | B2* | 2/2016 | You | H04L 45/306 |
| 9,258,241 | B2* | 2/2016 | Jungck | H04L 29/12066 |
| 9,264,459 | B2* | 2/2016 | Mosko | H04L 65/1096 |
| 9,268,813 | B2* | 2/2016 | Kim | H04L 67/06 |
| 9,270,598 | B1* | 2/2016 | Oran | H04L 67/327 |
| 9,276,751 | B2* | 3/2016 | Mosko | H04L 9/3247 |
| 9,276,840 | B2* | 3/2016 | Scott | H04L 45/306 |
| 9,282,050 | B2* | 3/2016 | Mosko | H04L 47/365 |
| 9,286,517 | B2* | 3/2016 | Deng | G06K 9/00711 |
| 9,326,042 | B2* | 4/2016 | Hong | H04N 21/64784 |
| 9,338,096 | B2* | 5/2016 | Xu | H04L 12/1822 |
| 9,338,150 | B2* | 5/2016 | Franck | H04L 63/04 |
| 9,363,086 | B2* | 6/2016 | Uzun | H04L 9/30 |
| 9,374,304 | B2* | 6/2016 | Solis | H04L 45/742 |
| 9,374,440 | B2* | 6/2016 | Ko | H04L 67/327 |
| 9,379,970 | B2* | 6/2016 | Wang | H04L 63/0272 |
| 9,379,979 | B2* | 6/2016 | Solis | H04L 45/7453 |
| 9,386,118 | B2* | 7/2016 | Farhadi | H04L 67/2842 |
| 9,391,896 | B2* | 7/2016 | Mosko | H04L 45/748 |
| 9,400,800 | B2* | 7/2016 | Jacobson | G06F 17/30174 |
| 9,401,864 | B2* | 7/2016 | Solis | H04L 45/74 |
| 9,407,432 | B2* | 8/2016 | Uzun | H04L 9/0822 |
| 9,407,549 | B2* | 8/2016 | Mosko | H04L 45/7453 |
| 9,426,113 | B2* | 8/2016 | Mahadevan | H04L 67/025 |
| 9,451,032 | B2* | 9/2016 | Scott | H04L 67/16 |
| 9,455,835 | B2* | 9/2016 | Mosko | H04L 63/12 |
| 9,456,052 | B2* | 9/2016 | Lee | H04L 67/32 |
| 9,456,054 | B2* | 9/2016 | Jacobson | G06F 15/173 |
| 9,461,907 | B2* | 10/2016 | Yu | H04L 45/08 |
| 9,462,006 | B2* | 10/2016 | Uzun | H04L 63/123 |
| 9,467,377 | B2* | 10/2016 | Solis | H04L 45/745 |
| 9,473,475 | B2* | 10/2016 | Uzun | H04L 63/062 |
| 9,473,576 | B2* | 10/2016 | Mosko | H04L 67/1095 |
| 9,497,282 | B2* | 11/2016 | Kurihara | H04L 1/08 |
| 9,503,365 | B2* | 11/2016 | Mahadevan | H04L 45/566 |
| 9,509,631 | B2* | 11/2016 | Lopez | H04L 47/805 |
| 9,516,138 | B2* | 12/2016 | Byun | H04L 67/322 |
| 9,516,144 | B2* | 12/2016 | Mosko | H04L 69/22 |
| 9,531,679 | B2* | 12/2016 | Uzun | H04L 63/0428 |
| 9,553,790 | B2* | 1/2017 | Kim | H04L 45/00 |
| 9,553,804 | B2* | 1/2017 | Yao | G06F 17/30867 |
| 9,553,812 | B2* | 1/2017 | Mahadevan | H04L 47/2466 |
| 9,577,949 | B2* | 2/2017 | Oran | H04L 47/722 |
| 9,590,887 | B2* | 3/2017 | Mahadevan | H04L 45/026 |
| 9,590,948 | B2* | 3/2017 | Mosko | H04L 61/3005 |
| 9,626,413 | B2* | 4/2017 | Mosko | G06F 17/3053 |
| 9,628,378 | B2* | 4/2017 | Bae | H04L 45/306 |
| 9,712,649 | B2* | 7/2017 | Lopez | H04L 69/166 |
| 9,716,622 | B2* | 7/2017 | Mahadevan | H04L 61/1582 |
| 9,716,664 | B2* | 7/2017 | Oran | H04L 47/283 |
| 9,729,662 | B2* | 8/2017 | Mahadevan | H04L 67/2842 |
| 9,749,384 | B2* | 8/2017 | Muramoto | H04N 21/2187 |
| 9,774,531 | B2* | 9/2017 | Azgin | H04L 45/7453 |
| 9,781,028 | B2* | 10/2017 | Ohnishi | H04L 45/14 |
| 9,794,238 | B2* | 10/2017 | Wood | H04L 63/061 |
| 9,832,116 | B2* | 11/2017 | Wood | H04L 45/54 |
| 2005/0232151 | A1* | 10/2005 | Chapweske | H04L 1/0002 |
| | | | | 370/231 |
| 2007/0147237 | A1* | 6/2007 | Haddad | H04L 47/10 |
| | | | | 370/229 |
| 2010/0195655 | A1* | 8/2010 | Jacobson | H04L 45/00 |
| | | | | 370/392 |
| 2010/0313257 | A1* | 12/2010 | Padinjareveetil | H04L 63/08 |
| | | | | 726/8 |
| 2011/0158101 | A1* | 6/2011 | Figueira | H04L 47/20 |
| | | | | 370/235.1 |
| 2012/0020559 | A1* | 1/2012 | Deng | G06K 9/00711 |
| | | | | 382/173 |
| 2012/0047279 | A1* | 2/2012 | Zhu | H04L 47/11 |
| | | | | 709/231 |
| 2012/0272160 | A1* | 10/2012 | Spivack | G06Q 10/10 |
| | | | | 715/752 |
| 2013/0011071 | A1* | 1/2013 | Deng | G06K 9/00711 |
| | | | | 382/195 |
| 2013/0083658 | A1* | 4/2013 | Vasseur | H04W 28/021 |
| | | | | 370/230.1 |
| 2013/0166668 | A1* | 6/2013 | Byun | H04L 67/322 |
| | | | | 709/207 |
| 2013/0223223 | A1* | 8/2013 | Meloche | H04L 47/31 |
| | | | | 370/235 |
| 2013/0246576 | A1* | 9/2013 | Wogsberg | H04N 7/181 |
| | | | | 709/219 |
| 2014/0095605 | A1* | 4/2014 | Varvello | H04L 67/108 |
| | | | | 709/204 |
| 2014/0172981 | A1* | 6/2014 | Kim | H04L 65/4084 |
| | | | | 709/204 |
| 2014/0289325 | A1* | 9/2014 | Solis | H04L 67/327 |
| | | | | 709/204 |

(56) References Cited

U.S. PATENT DOCUMENTS

| | | | |
|---|---|---|---|
| 2014/0351929 A1* | 11/2014 | Mahadevan | H04L 63/1408 |
| | | | 726/22 |
| 2015/0043592 A1* | 2/2015 | Kim | H04L 45/00 |
| | | | 370/400 |
| 2015/0095481 A1* | 4/2015 | Ohnishi | H04L 1/004 |
| | | | 709/223 |
| 2015/0117253 A1* | 4/2015 | Scott | H04L 45/306 |
| | | | 370/254 |
| 2015/0257159 A1* | 9/2015 | Speicher | H04W 28/0268 |
| | | | 370/235 |
| 2015/0281083 A1* | 10/2015 | Kim | H04L 45/7457 |
| | | | 370/235 |
| 2015/0304380 A1* | 10/2015 | Muramoto | H04N 21/2187 |
| | | | 709/219 |
| 2015/0312373 A1* | 10/2015 | Muramoto | H04L 47/283 |
| | | | 370/238 |
| 2016/0019110 A1* | 1/2016 | Mosko | G06F 11/0784 |
| | | | 714/57 |
| 2016/0094439 A1* | 3/2016 | Ravindran | H04L 45/306 |
| | | | 709/238 |
| 2016/0134915 A1* | 5/2016 | Oran | H04N 21/2662 |
| | | | 725/95 |
| 2016/0173410 A1* | 6/2016 | Lopez | H04L 47/805 |
| | | | 370/230 |
| 2016/0182368 A1* | 6/2016 | Azgin | H04L 45/306 |
| | | | 370/331 |
| 2016/0255037 A1* | 9/2016 | Spivack | G06Q 10/10 |
| | | | 706/12 |
| 2016/0255535 A1* | 9/2016 | De Foy | H04L 67/2804 |
| | | | 370/236 |
| 2017/0264536 A1* | 9/2017 | Wood | H04L 45/54 |
| 2017/0279920 A1* | 9/2017 | Wood | H04L 43/0864 |
| 2018/0041608 A1* | 2/2018 | Wood | H04L 67/327 |

\* cited by examiner

FIG. 9A

Pending Interest Table(PIT) of Router 32

| Content Name | Traffic classification | Face ID |
|---|---|---|
| Y | 3 | 0(31) |
| X | 5 | 0(31) |
|  |  |  |

FIG. 9B

Pending Interest Table(PIT) of Router 32

| Content Name | Traffic classification | Face ID |
|---|---|---|
| Y | 3 | 0(31) |
| X | 5 | 0(31) |
|   | 1 | 1(35) |
|  |  |  |

CONTENT CENTRIC NETWORKING SYSTEM PROVIDING DIFFERENTIATED SERVICE AND METHOD OF CONTROLLING DATA TRAFFIC IN CONTENT CENTRIC NETWORKING PROVIDING DIFFERENTIATED SERVICE

CROSS-REFERENCE TO RELATED APPLICATIONS

This application claims the benefit under 35 U.S.C. § 119(a) of Korean Patent Application No. 10-2014-0036529, filed on Mar. 28, 2014 and Korean Patent Application No. 10-2014-0036531, filed on Mar. 28, 2014, in the Korean Intellectual Property Office, the entire disclosure of which is incorporated herein by reference for all purposes.

BACKGROUND

1. Field

The following description relates to a method to provide a differentiated service on in content centric networking, and content centric networking that provides a differentiated service.

2. Description of Related Art

The IP-based internet provides a differentiated service, hereafter, referred to as "DiffServ." Such an approach classifies and manages network traffic and provides quality of service (QoS) on networks. Such a differentiated service is also potentially referred to as a differential service, and providing services in such a manner is referred to as providing services "differentially." Such a differentiated service divides application services into several classes and provides differentiated transmission qualities in accordance with the classes.

On the other hand, study and use of content centric networking, hereafter, referred to as "CON", that is based on a different paradigm from the communication model based on IP addresses have been increasingly conducted.

Currently, according to the manner of transmission on the Internet, services are provided on the basis of using the IP (Internet Protocol) addresses of transmitting and receiving hosts, so the same data is repeatedly transmitted as many times as there are requests from servers. By contrast, CCN approaches request and deliver data, using content names instead of IP addresses, so that it is possible to quickly provide services and share data, without repeatedly transmitting data in a redundant or unnecessary manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Although CCN has many advantages, as compared with the IP-based network, existing technologies are not capable of providing differentiated services to satisfy various characteristics and demands of traffic in certain circumstances and situations.

An example provides a network architecture for providing a differentiated service in CCN.

Another example provides a method of controlling data traffic for providing a differentiated service in CCN.

In one general example, a content centric networking system provides a differentiated service, including a client device configured to create an interest packet, an edge router that is connected with the client device in the content centric networking system, configured to determine traffic class information for the interest packet, and configured to mark the determined traffic class information in association with the interest packet, and a differentiated service router configured to store the traffic class information in a pending interest table when receiving the interest packet marked with the traffic class information, and configured to differentially transmit data requested by the interest packet on the basis of the traffic class information.

The edge router may determine the traffic class information on the basis of at least one of a content name, a type of requested data, identification information of a client device, identification information of the user who requests the service, information of time when a content is requested, information of a charge on the user, and information about congestion of a network.

The differentiated service router may transmit the data by controlling per-hop-behavior according to the traffic class information.

The interest packet may include a field for storing the traffic class information and the pending interest table may include a field for storing the traffic class information.

The differentiated service router may receive a first interest packet, and store first traffic information included in the first interest packet in the pending interest table, and then in response to the differentiated service router receiving a second interest packet having the same content name as the content name included in the first interest packet and having traffic class information with a priority higher than that of the first interest packet, the differentiated service router may store second traffic information included in the second interest packet in the pending interest table and may transmit the second interest packet to a content server.

In another general aspect, a method to control data traffic in content centric networking to provide a differentiated service includes receiving interest packets from a client device by means of an edge router connected to the client device in content centric networking, marking traffic class information having a priority for the interest packets in association with at least one of the interest packets using the edge router, differentially transmitting data packets requested by the interest packets to the edge router based on the traffic class information using a differentiated service router existing in a path reaching a content server from the edge router, determining a receiving rate of the data packets by means of the edge router, and controlling traffic by adjusting the quantity of the interest packets marked with the traffic class information based on the result of comparing the receiving rate with an agreed receiving rate, or by changing the traffic class information about the interest packets, using the edge router.

In the marking of traffic class information, the edge router may determine and may mark a quantity of interest packets to be marked with traffic class information, to correspond to the agreed receiving rate.

In the marking of traffic class information, the edge router may determine a quantity of interest packets to be marked with traffic class information to be a predetermined value and then may mark corresponding class information based on the determined quantity of interest packets.

In the determining of a receiving rate, the edge router may determine the receiving rate as a quantity of data packets received based on interest packets marked with the traffic class information for a reference period.

The agreed receiving rate may be determined on the basis of at least one of a content name, a type of requested data, identification information of a client device, identification information of the user who requests the service, information of time when a content is requested, information of a charge on the user, and information about congestion in a network.

In the controlling of traffic, in response to the receiving rate exceeding the agreed receiving rate, the edge router may decrease the quantity of the interest packets to be marked in association with the traffic class information in proportion to the degree of excess, and in response to the receiving rate being less than the agreed receiving rate, the edge router may increase the quantity of interest packets to be marked in association with the traffic class information in proportion to the degree of deficit.

In the controlling of traffic, in response to the receiving rate exceeding the agreed receiving rate, the edge router may not transmit a quantity of interest packets in proportion to the degree of excess to a next router.

In the controlling of traffic, in response to the receiving rate exceeding the agreed receiving rate, the edge router may lower the priority included in the traffic class information in proportion to the degree of excess.

The edge router may determine the quantity of the interest packets to be marked with traffic class information having the same or lower priority in accordance with the degree of excess.

In another general aspect, an edge router connected to a client device in content centric networking may include a processor configured to determine traffic class information for interest packets received from the client device and configured to mark the determined traffic class information in association with the interest packets, a memory configured to store a pending interest table comprising content names included in the interest packets and information about interfaces receiving the interest packets, and a communication interface configured to communicate with a next router existing in a path between the client device and a content server.

The processor may determine the traffic class information on the basis of at least one of a content name, a type of requested data, identification information of a client device, identification information of the user who requests the service, information of time when a content is requested, information of a charge on the user, and information about congestion in a network.

In another general aspect, an edge router connected to a client device in content centric networking includes a memory configured to store receiving rate standard information about an agreed receiving rate for interest packets, a processor configured to mark traffic class information, which comprises priorities of the interest packets determined on the basis of the receiving rate standard information and traffic standard information comprising at least one of a content name, a type of requested data, identification information of the client device, and identification information of a user who requests the service which are received from the client device, in association with at least some of the interest packets, and configured to control traffic by adjusting an amount of the interest packets to be marked with the traffic class information based on the result of comparing the agreed receiving rate with a receiving rate of data packets requested by the interest packets, or by changing the traffic class information for the interest packets, and a communication interface configured to communicate with a next router existing in a path reaching the client device and a content server.

The processor may determine the agreed receiving rate on the basis of at least one of a content name, a type of requested data, identification information of a client device, identification information of the user who requests the service, information of time when a content is requested, information of a charge on the user, and information about congestion in a network.

The processor may determine the receiving rate of the data packets as an amount of data packets received based on interest packets marked with the traffic class information for a reference period.

The processor may control the amount of the interest packets to be marked with the traffic class information so that the receiving rate of the data packets corresponds to the agreed receiving rate, or adjusts the priority included in the traffic class information.

In another general aspect, a content centric networking system that provides a differentiated service includes an edge router that is connected with a client device in the content centric networking system that creates an interest packet, and is configured to determine a traffic class for the interest packet, and configured to mark the determined traffic class information in association with the interest packet, and a differentiated service router configured to store the traffic class information in a pending interest table when receiving the interest packet marked with the traffic class information, and configured to differentially transmit data requested by the interest packet on the basis of the traffic class information.

The examples are not limited to those described above and other examples are intended to be understood by those skilled in the art as being taught by the following description.

Other features and aspects will be apparent from the following detailed description, the drawings, and the claims.

BRIEF DESCRIPTION OF THE DRAWINGS

FIGS. 9A and 9B are diagrams illustrating examples of information kept in PITs (Pending Interest Tables) managed by some of the differentiated service routers illustrated in FIGS. 8A and 8B.

Figure 1B:
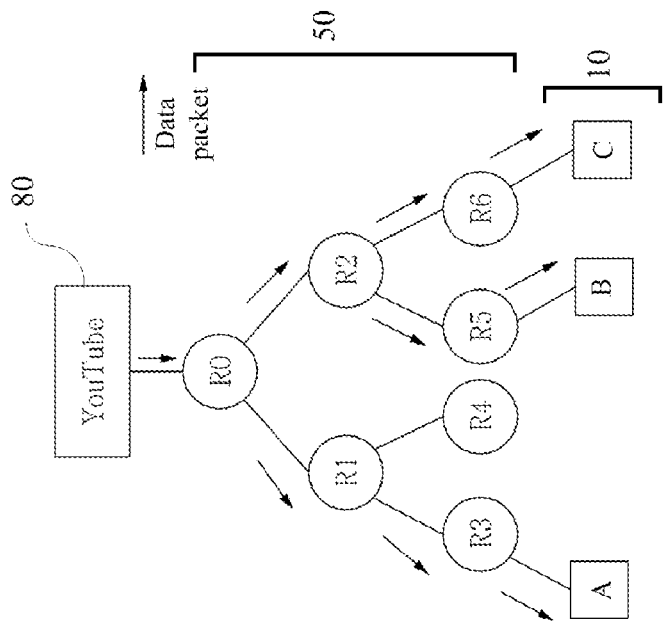
FIGS. 1A and 1B are diagrams illustrating examples of the basic operation of content centric networking.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Content centric networking, hereafter, referred to as "CCN" is also referred to by various other terms such as Named Data Networking (NDN) and Information Centric Networking (ICN). The networking discussed in this description is referred to as a CCN, and refers to networking of this type.

A CCN system for providing a differentiated service, an edge router 200 connected to client devices in CCN, a method 300 to provide a differentiated service in CCN, a differentiated service router 400 in CCN, an edge router 500 connected to client devices in CCN, and a method of controlling data traffic in CCN are described further in detail with reference to the accompanying drawings. It is assumed that contents requested by users exist in a content server or a router, for the convenience of description.

Figure 1A:
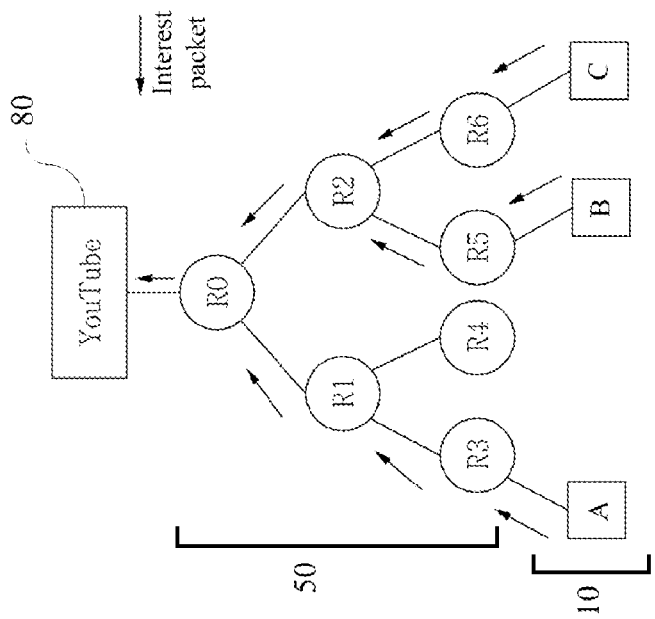

The basic operation of CCN is described first. FIGS. 1A and 1B are diagrams illustrating examples of the basic operation of CCN. The CCN requests and delivers contents, using content names to identify the contents. Using those names to identify the contents potentially provides advantages including in-network caching and interest aggregation. In such an approach, the in-networking caching keeps data after an intermediate router transmits the data, and then services the data from a cache when a request for the same data is input thereafter. By caching data in such a manner, it is possible to avoid retransmitting data because the cached data is already available. With respect to interest aggregation, when several requests for the same data are received within a short time, interest aggregation transmits the data to the original source only in response to the first request, and for the packet of the following requests, keeps only information about which interfaces they have been received through. Therefore, when data is received, in interest aggregation, the CCN transmits copies of the data to all the interfaces through which an interest packet has been received. As described above, using techniques such as in-network caching and interest aggregation the CCN efficiently requests and delivers contents, minimizing repeated transmission of data.

FIG. 1A is a diagram illustrating an example of a process of requesting a specific content or data by a user. Client devices 10 are computer systems that provide the ability for users to request specific contents and routers 50 are relay devices for transmitting interest or data packets between the client devices 10 and a content server 80 in a CCN. For example, "YouTube" that provides a video streaming service is presented as an example content server 80 in FIGS. 1A and 1B. The content server 80 in FIGS. 1A and 1B is a server that provides video contents to client devices 10 in a CCN.

The client devices 10 transmit interest packets, which are content request messages, to the routers 50, using the name of desired contents to identify the desired contents. The client devices 10 transmit interest packets used for ascertaining which contents are the contents requested by users to adjacent routers. For example, a client device A 10 transmits an interest packet to an adjacent router R3 50 and the router R3 50 transmits the interest packet to another adjacent router R1 50 on the path reaching the content server 80. The router R1 50 transmits the interest packet to another adjacent router R0 50 on the path reaching the content server 80. The router R0 50 transmits the interest packet to the content server 80. The other client devices B 10 and C 10 also transmit interest packets in the same way to the content server 80.

FIG. 1B illustrates an example of transmitting data packets from the content server 80 to the client devices 10. The data packets are transmitted through the paths in the reverse order of the transmission of the interest packets. Here, CCN is different from the IP-based network approach in that when routers 50 receive data packets, they consistently keep corresponding data in their storages. For example, when the router R3 50 receives an interest packet for a content having a content name the same as before from the client device A 10, it does not transmit the interest packet again, but instead transmits a content kept in its storage to the client device A 10.

Figure 2:
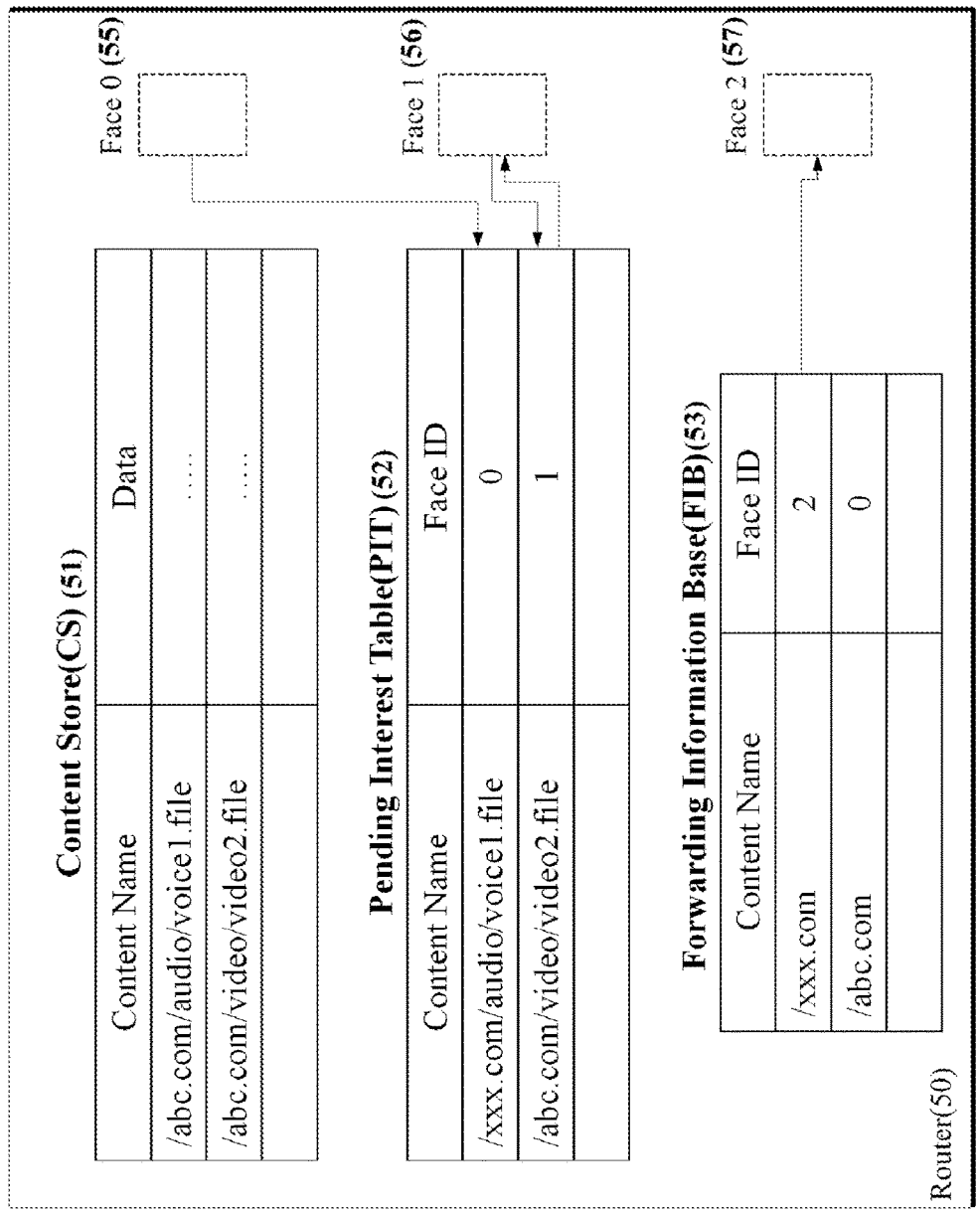
FIG. 2 is a diagram illustrating an example of information managed by a router to process interest and data packets in content centric networking.

FIG. 2 is a diagram illustrating an example of information managed by a router to process interests and data packets in content centric networking. FIG. 2 illustrates further components associated with packet processing by the router 50.

The router 50 includes a content store 51, hereafter, referred to as "CS", a pending interest table 52, hereafter, referred to as "PIT", and a forwarding information base 53, hereafter, referred to as "FIB". Further, the router 50 includes interfaces 55, 56, and 57 for communication with other nodes.

The CS 51 retains contents, which correspond to data transmitted from the content server 80. Here, the CS 51 includes content names and data corresponding to the content names. Additionally, the PIT 52 guides interest aggregation and content data transmission paths.

The PIT 52 transmits interest packets to other nodes and records and manages which interfaces, also referred to as Faces, the interest packets have been transmitted through. The PIT 52 guides interest aggregation and content data transmission paths. To clarify the usage of terms in the following description, it is assumed and intended that the terms "interface" and "face" are used to indicate the same object and refer to a data transmission path through which a router transmits/receives a packet to and/or from another node.

The FIB 53 is used to forward interest packets. The FIB 53 functions as a routing table for determining an interface that is to be used to transmit a packet from a content name. As part of the forwarding, the content server 80 registers its name prefix on a CCN network. Subsequently, the name prefix spreads in accordance with a certain routing protocol.

The content names in CCN function as identifiers that are used for finding out nodes in a CCN where contents are kept. Therefore, each content uses its own peculiar name, and when two contents have different content names, they are considered as being different contents even if they include the same data. In an example, the content names are hierarchically expressed in a form such as "/abc.com/audio/voice1.file" illustrated in FIG. 2. Such a hierarchical form names a given file and also includes information about its relationship to other data.

In the example of FIG. 2, it is assumed for purposes of illustration that the router 50 has received an interest packet requesting a content, named as "/abc.com/video/video2.file" from the Face 1 56. The router 50 checks first whether there is a corresponding content in the CS 51 with reference to the hierarchical name "/abc.com/video/video2.file" of the content as identified in the interest packet.

Since the corresponding content is kept in the CS 51 and hence is already available without further network transmission of such content, the router 50 returns the content to the Face 1 56 receiving the interest packet.

By contrast, in a situation where the router 50 receives a request for a content "xxx.com/audio/voice1.file" from the Face 0 55, there is no corresponding content kept in the CS 51. Thus, the router 50 checks whether there is an entry kept with the same content name in the PIT 52. When there is an entry kept with the same content name, the router 50 adds the information about the interface, which is Face 0 55 in this case, as indicated in the first entry in the PIT 52, which is to be used for receiving the content request packet corresponding to the entry.

When there is no entry registered with the same content name in the PIT 52, the router 50 records the content name and the interface in the PIT 52 and then finds out the corresponding entry by performing a name look up based on content names in the FIB 53. In an example, the router 50 performs the name lookup in accordance with a longest prefix matching technique.

The router 50 determines a face to which the interest packet is to be transmitted, on the basis of the information registered in the FIB 53 and then transmits the interest packet to the interface 2 57.

The router 50 transmits the interest packet toward the source of the corresponding content. That is, the router transmits the interest packet along the path reaching the content server 80, where the interest packet is forwarded on the basis of the content name in the interest packet. In this example, the router 50 transmits an interest packet only one time for the same content for a predetermined time. Then, when the router 50 receives an interest packet for the same content, the router 50 adds only the information about the interface receiving the interest packet to the PIT 52.

Thus, as illustrated in FIG. 1A, even if a plurality of users simultaneously request the same content, and such content is popular and widely requested, the routers R3, R5, R6, R1, R2, and R0 each transmit an interest packet only one time toward the content server 80, avoiding redundancy and inefficiency.

When interest packets are transmitted to the content server 80, the content server 80 delivers data packets, including content, in a direction that is the reverse of the direction of the transmission of the interest packets, as illustrated in FIG. 1B. Since the router 50 retains the information about the interfaces receiving interest packets in the PIT 52, when it receives data packets of corresponding contents, the router 50 transmits the data packets to all the interfaces that have received the interest packets. Using such an approach, data packets allow the information to propagate appropriately while preserving efficiency and allowing good performance.

Figure 3A:
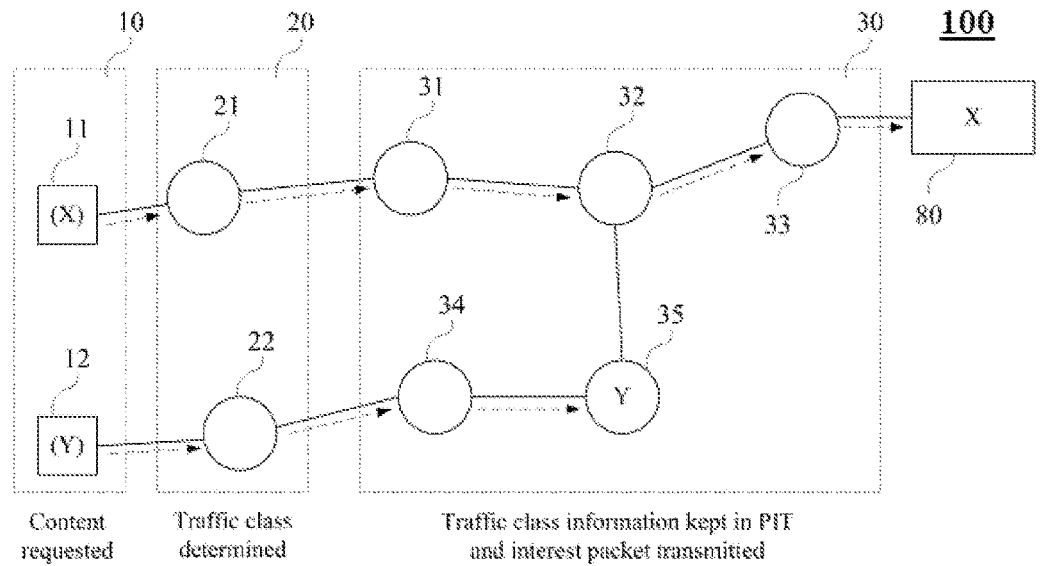
FIGS. 3A and 3B are diagrams illustrating examples of a configuration and a method for providing a differentiated service in a content centric networking system.
Figure 3B:
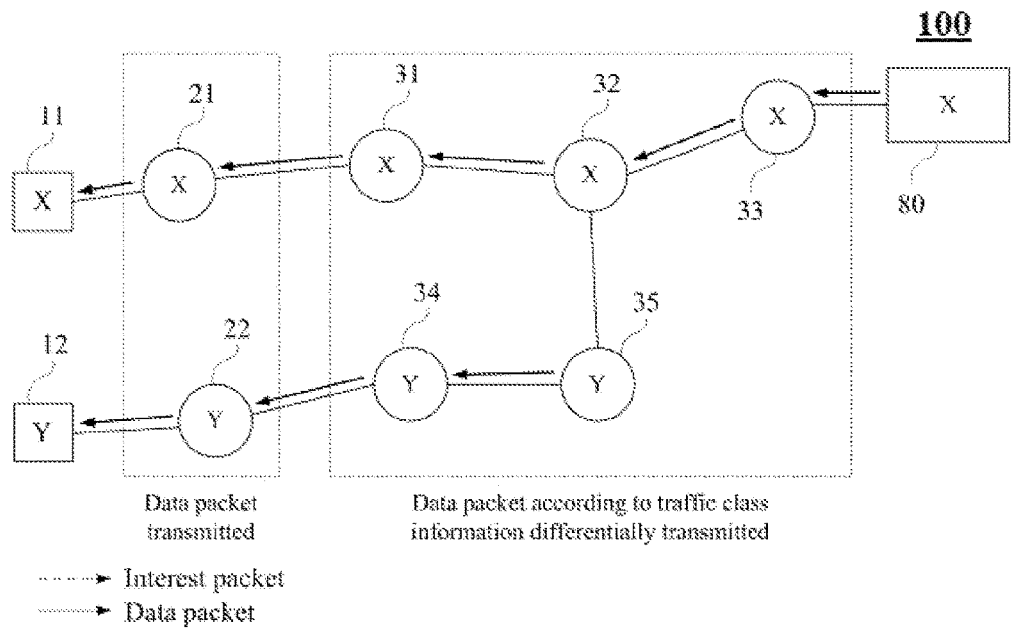

FIGS. 3A and 3B are diagrams illustrating examples of a configuration and a method for providing a differentiated service in a CCN system.

The CCN system 100 providing a differentiated service includes several constituent elements. These elements include a client device 10 configured to create an interest packet; an edge router 20 connected to the client device in CCN, configured to determine a traffic class for an interest packet received from the client device, and configured to mark the determined traffic class information to the interest packet; and a differentiated service router 30, which, when receiving the interest packet marked with the traffic class information, is configured to keep the traffic class information in a PIT and transmit, using a differentiated approach, the data requested by the interest packet in accordance with the traffic class information.

The edge router 20 is intended to refer to a router that is directly connected to the client device 10 in a network. The differentiated service router 30 refers to another router with the exception of the edge router 20. Though described below, the edge router 20 may have the function of the differentiated service router 30.

The edge router 20 and the differentiated service router 30 are devices that have the same structure as that of the router 50 illustrated in FIGS. 1A-1B, although indicated by different reference numerals for clarity of explanation. In order to provide a differentiated service in the CCN system, the edge router 20 determines the traffic classes of received interest packets and the differentiated service router 30 differentially transmits the received interest and data packets in accordance with the determined traffic classes. The edge router 21 performs traffic classification for interest packets, so that a core router with high overhead in a network focuses only on transmitting packets. Furthermore, even if the core router 30 services data from its cache, there is no need for it to perform a specific complicated operation such as traffic classification.

In an example, the edge router 20 determines traffic class information on the basis of at least one of a content name, the type of requested data, the identification information of a client device, and the identification information of the user who requests the service. The edge router 20 names the information used for determining traffic class information as traffic standard information. The traffic standard information includes at least one of a content name, the type of requested data, the identification information of a client device, and the identification information of the user who requests the service. A process of traffic classification is described further, below.

FIG. 3A illustrates an example of transmitting interest packets in the CCN system providing a differentiated service. A client device 11 requests a content X and a client device 12 request a content Y. The parentheses illustrated in FIG. 3A in the client devices 11 and 12 are used to mean that the corresponding contents are requested.

The interest packet X created by the client device 11 is transmitted to an edge router 21 that is directly connected to the client device 11. The interest packet X refers to the interest packet requesting the content X. The edge router 21 determines the traffic class information for the interest packet X and adds the traffic class information to the interest packet X. Accordingly, in such an example, the interest packet has a field for storing traffic class information for the packet. Similarly, the edge router 22 determines the traffic class information for the interest packet Y and adds the traffic class information to the interest packet Y in an analogous manner.

Traffic class information is used for the differentiated service router 30 to differentially transmit contents requested by interest packets. To this end, the differentiated service router 30 extracts traffic class information from an interest packet having the traffic class information and stores the traffic class information in its PIT. Accordingly, when the differentiated service router 30 transmits an interest packet, the PITs of the differentiated service routers 31, 32, and 33 store the traffic class information of the interest packet X and the PITs of the differentiated service routers 34 and 35 additionally store the traffic class information of the interest packet Y. Accordingly, the PITs use a field for keeping traffic class information.

FIGS. 3A and 3B illustrate a state in which the content Y is stored in the router 35. Accordingly, the interest packet Y is not transmitted further to the differentiated service router 35. Thus, avoiding additional transmission improves performance and efficiency.

FIG. 3B illustrates an example of transmitting data packets in the CCN system providing a differentiated service. The content X is transmitted to the client device 11 from the content server 80 as the data packet, in the reverse order of the transmission of the interest packet X. Thus, the transmission of the interest packet X designates a path for transmitting the content, which is reversed to actually distribute the content. The routers 21, 31, 32, and 33 in the path reaching the client device 11 from the content server 80 store the content X in their CSs.

Similarly, the content Y is transmitted to the client device 12 from the differentiated service router 35 in the reverse order of the transmission of the interest packet Y, and in the transmission process, the content Y is stored in the CSs of the routers.

When a data packet is transmitted, the differentiated service routers 31, 32, and 33 differentially transmits a data packet corresponding to the interest packet X based on the traffic class information of the interest packet X kept in their PITs. The differentiated service router 30 transmits, in a differentiated manner, a data packet in an approach similar to the differentiated service provided by a IP-based network. This approach is discussed further, below.

In FIG. 3B, the edge routers 21 and 22 simply transmit the received data packet directly to the client devices 11 and 12.

Figure 4A:
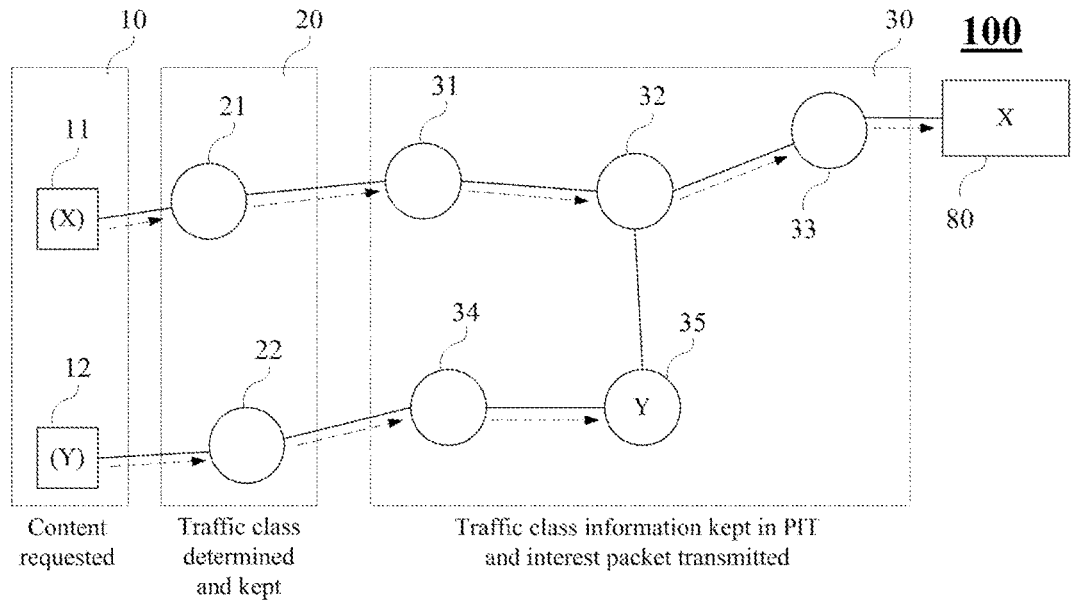
FIGS. 4A and 4B are diagrams illustrating examples of the configuration and the method for providing a differentiated service in the content centric networking system.
Figure 4B:
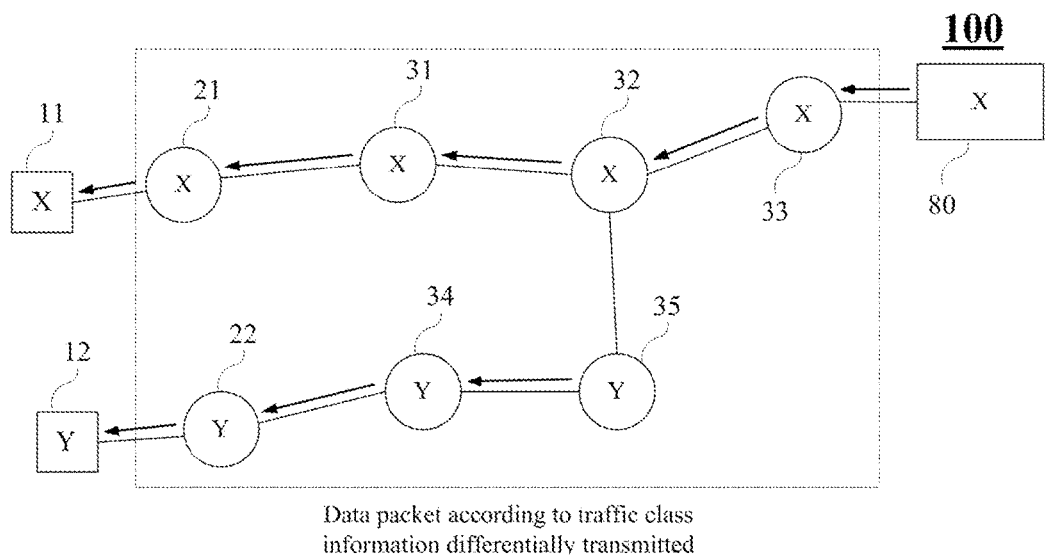

FIGS. 4A and 4B are diagrams illustrating examples of the configuration and the method for providing differentiated services in the CCN system 100. FIG. 4A illustrates an example of transmitting an interest packet in the CCN system 100 providing a differentiated service and FIG. 4B illustrates an example of transmitting a data packet in the CCN system 100 providing a differentiated service.

FIG. 4A is somewhat similar to FIG. 3A, but is different from FIG. 3A in that the edge routers 21 and 22 also determine a traffic class and store the traffic classes that they have determined in their PITs. In FIG. 4B, the edge routers 21 and 22 differentially transmit received data packets to the client device 11 and 12, using the traffic information kept in their PITs. That is, the CCN system 100 illustrated in FIGS. 4A and 4B is different from that illustrated in FIGS. 3A and 3B in that the edge router 20 also differentially transmits a data packet.

The examples illustrated in FIGS. 3A and 3B and FIGS. 4A and 4B are examples of architectures that are potentially determined by a company or a service provider who configures and manages the CCN system 100.

Figure 5:
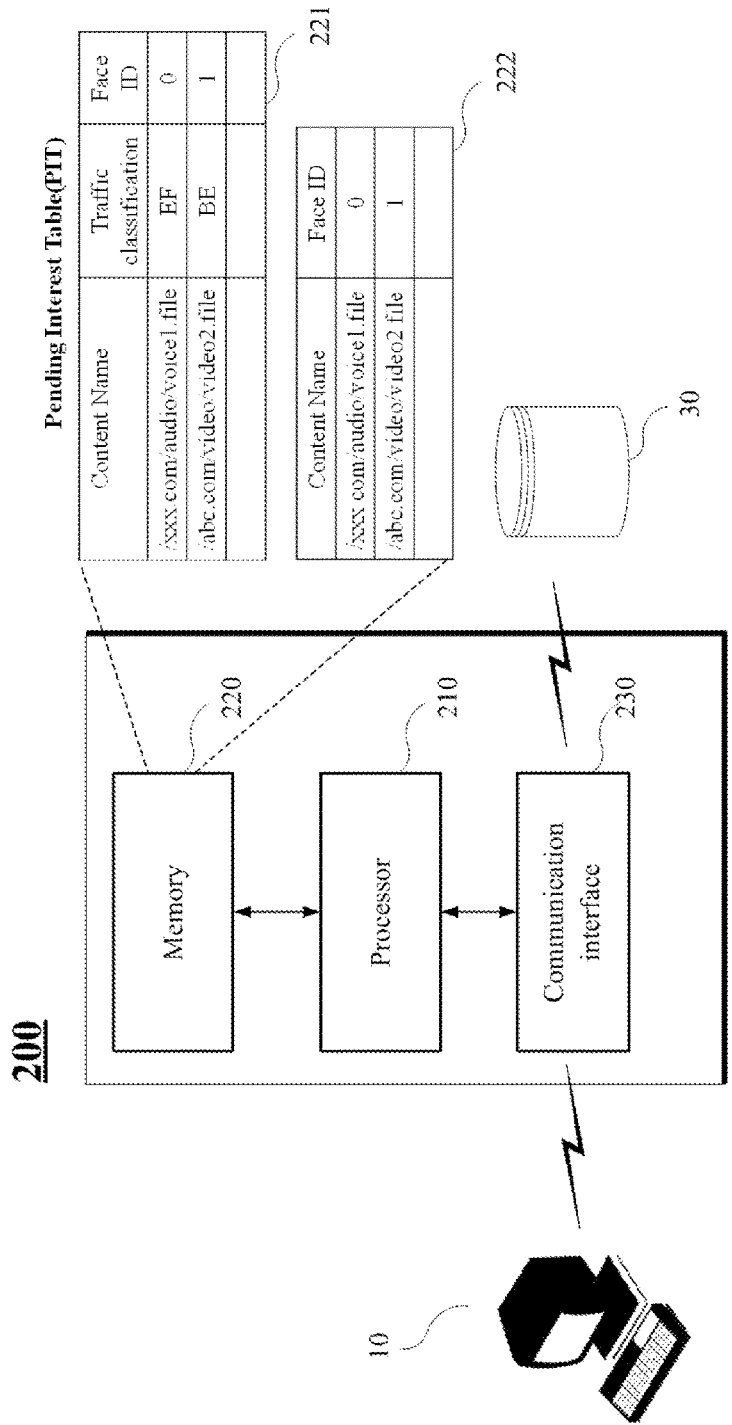
FIG. 5 is a block diagram illustrating an example of the configuration of an edge router connected to a client device in content centric networking.

FIG. 5 is a block diagram illustrating an example of the configuration of an edge router 200 connected to a client device in CCN. The router 200 illustrated in FIG. 5 corresponds to the edge router 20 illustrated in FIGS. 3A and 3B and FIGS. 4A and 4B, but is indicated by a different reference numeral for clarity of explanation. FIG. 5 is not intended to illustrate all of the hardware components of the edge router 200, but simply illustrates the components of the edge router 200 that are associated with the process of traffic classification.

The edge router 200, which is connected to a client device in CCN, determines traffic class information on the basis of traffic standard information including at least one of the identification information about a client device, the content name, the type of requested data, and the identification of the user, and includes a processor 210 that adds the determined traffic class information to interest packet information, a memory 220 that keeps a PIT including the content name in an interest packet and the information on the interface receiving an interest packet, and a communication interface 230 for communication with the next router in the path between the client device 10 and a content server 80. The memory 220 is structured to store data including entries such as information for a CS and an FIB, as well as the PIT.

FIG. 5 illustrates a PIT 221 including traffic class information, indicated as being Traffic classification, and a PIT 222 not including traffic class information. When the edge router 200 differentially transmits a data packet, as in FIG. 4B, the PIT 221 is used, and when the edge router 200 is not involved with differentiated transmission of a data packet, the PIT 222 is used. Hence, a PIT that is adapted for the appropriate role of traffic classification information is used when transmitting a data packet.

Although two PITs 221 and 222 are illustrated in the example of FIG. 5, in another example, there Is only one PIT that includes traffic class field information, and when a traffic class field value is not set or is set to zero or another appropriate null value, differentiated transmission is not performed.

The processor 210 determines traffic class information on the basis of traffic standard information including at least one of a content name, the type of requested data, the identification information of a client device, and the identification information of the user who requests the service.

In an example, the traffic class information is classified in accordance with various references or agreements that represent preconditions used to classify the traffic class information.

For example, in a first approach, the traffic class information is determined in accordance with an agreement or a contract between a service provider and a user who requests the service. That is, the service provider or company provides a service with a low data transmission rate to a user who prefers a cheap communication plan, or alternatively provides a service maintaining a high data transmission rate to a user who selects an expensive communication plan. Thus, in such an approach, a user pays for improved service, and users designated for improved service have their network traffic prioritized. In this case, the edge router 200 or the processor 210 uses the identification information about the service user in order to determine traffic class information, in order to ascertain the level of priority associated with a user in this manner.

In a second approach, the traffic class information is determined in accordance with the client device requesting content, irrespective of a contract between a user and the service provider. In such an approach, the data transmission rate is associated with a requesting device, such that certain requesting devices are designated as having a higher priority. In such an example, the service provider provides a low data transmission rate for a service that is offered free at a public place or provides a high data transmission rate for devices associated with companies or others customers that have paid to have traffic for their devices be prioritized. In this case, the edge router 200 requires the identification information about a client device in order to determine traffic class information, in order to ascertain the level of priority associated with a client device in this manner.

In a third approach, the traffic class information is determined on the basis of the content name requested by a user. That is, a service provider may set a predetermined data transmission rate in advance for specific contents. In such an example, it is predetermined that certain data is to be prioritized and network traffic including that data is to be treated as being more important than other data that is considered to be less important. For example, a service provider maintains a transmission rate at a level capable to provide an appropriate service level for video contents that gain many views. In such an example, the provider maintains the transmission rate to ensure appropriate bandwidth for important content. Such an approach provides a satisfactory service while managing the load throughout the network by treating other content as less important. In this case, the edge router 200 requires a content name in order to determine traffic class information, in order to ascertain the level of priority associated with a piece of content in this manner.

In a fourth approach, the traffic class information is determined on the basis of the type of the content or data requested by a user. The type of a content refers to the type of the data of a content or a file as being used for a specific application. For example, a text file is potentially designated as having a different priority than a video file. In this case, the edge router 200 requires the information about the type of a content or data in order to determine traffic class information, in order to ascertain the level of priority associated with a type of content in this manner.

In a fifth approach, further, the traffic class information is not fixed or predetermined, but instead the traffic class information is dynamic. For example, different traffic classes are determined for the same content name, depending on the charge, time, and network situation, in accordance with a choice by a user. Alternatively, a network service provider sets traffic class information dynamically to efficiently use the network resources, depending on the degree of congestion of the network. However, these are only examples, and other aspects of this approach are used in other examples, in which various appropriate information is used to determine the traffic class information dynamically.

Figure 6:
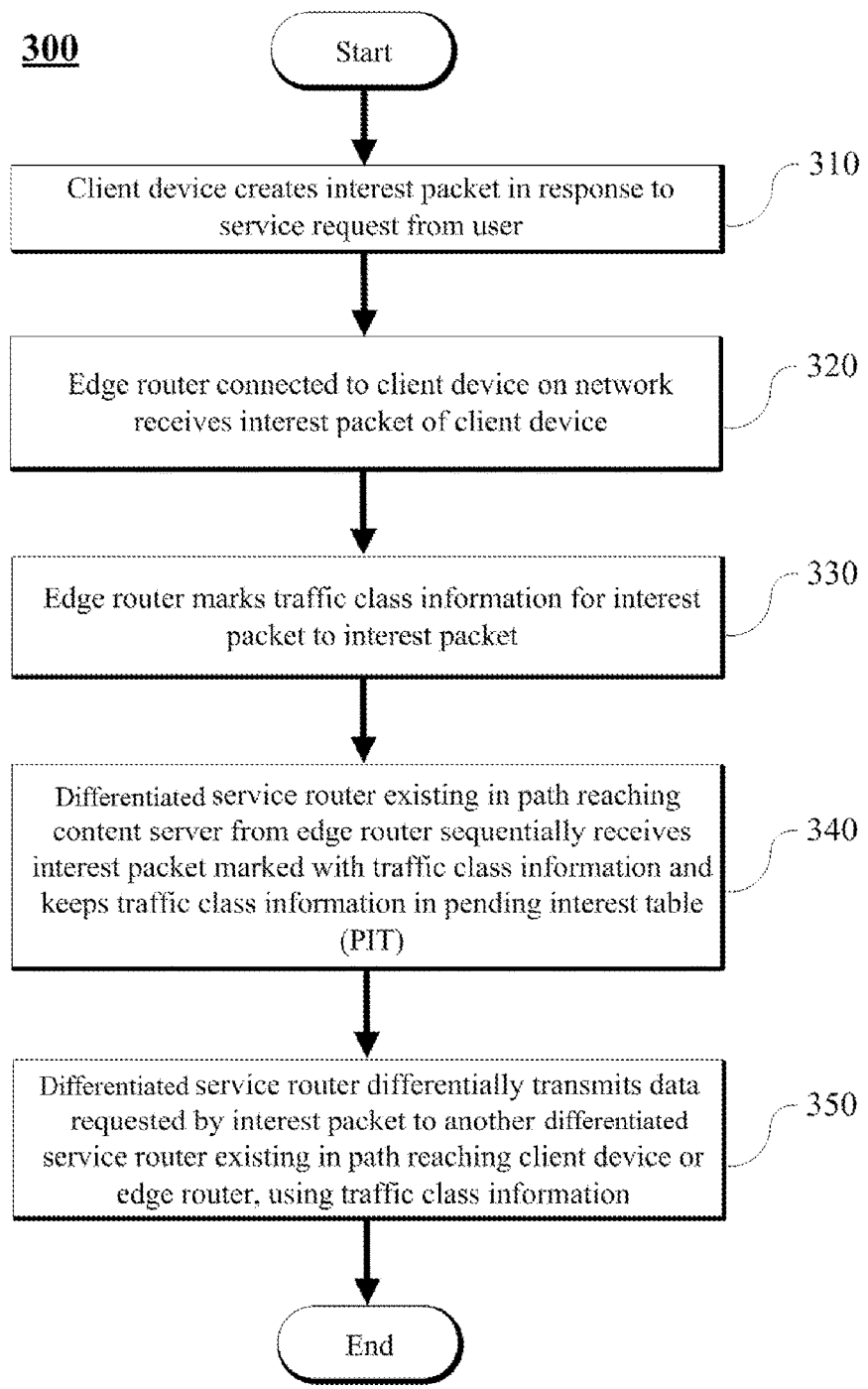
FIG. 6 is a flowchart illustrating an example of a method to provide a differentiated service in content centric networking.

FIG. 6 is a flowchart illustrating an example of a method 300 to provide a differentiated service in CCN. The method 300 to provide a differentiated service in CCN is a method of operating the CCN system 100 to provide a differentiated service described above. Accordingly, the configuration repeated from that described above is omitted for brevity. In the following description of the method 300 to provide a differentiated service in CCN, the reference numerals of the system are not provided. However, the components having the same names are intended to refer to the same or similar components of the CCN system 100 providing a differentiated service as described above.

The method 300 to provide a differentiated service in CCN includes creating an interest packet by means of a client device in response to a service request from a user at operation 310, receiving the interest packet from the client device by means of an edge router connected to the client device in a network at operation 320, marking traffic class information of the interest packet, which is determined on the basis of information in the interest packet by the edge router, to the interest packet at operation 330, sequentially receiving the interest packet marked with the traffic class information and keeping the traffic class information in PITs, by means of differentiated service routers in paths reaching a content server from the edge router at operation 340, and differentially transmitting data requested by the interest packet to another differentiated service router or the edge router in a path reaching to the client device, by means of the differentiated service routers using the traffic class information at operation 350.

In the marking of traffic class information at operation 330, the edge router determines traffic class information on the basis of traffic standard information including at least one of a content name, the type of requested data, the identification information of a client device, and the identification information of the user who requests the service.

In the marking of traffic class information at operation 330, the edge router keeps the traffic class information in its PIT, in which the method 300 to provide a differentiated service in CCN further includes differentially transmitting data to the client device by means of the edge router using the stored traffic class information. Though not illustrated in FIG. 6, this operation is performed after differentially transmitting the data 350.

In the differentiated transmission of data 350, the differentiated service router transmits the traffic class information to another differentiated service router or the edge router in an approach using per-hop behavior, on the basis of the traffic class information. The use of per-hop behavior is the same as or similar to the way the per-hop behavior is used to provide a differentiated service in the IP-based network.

Figure 7:
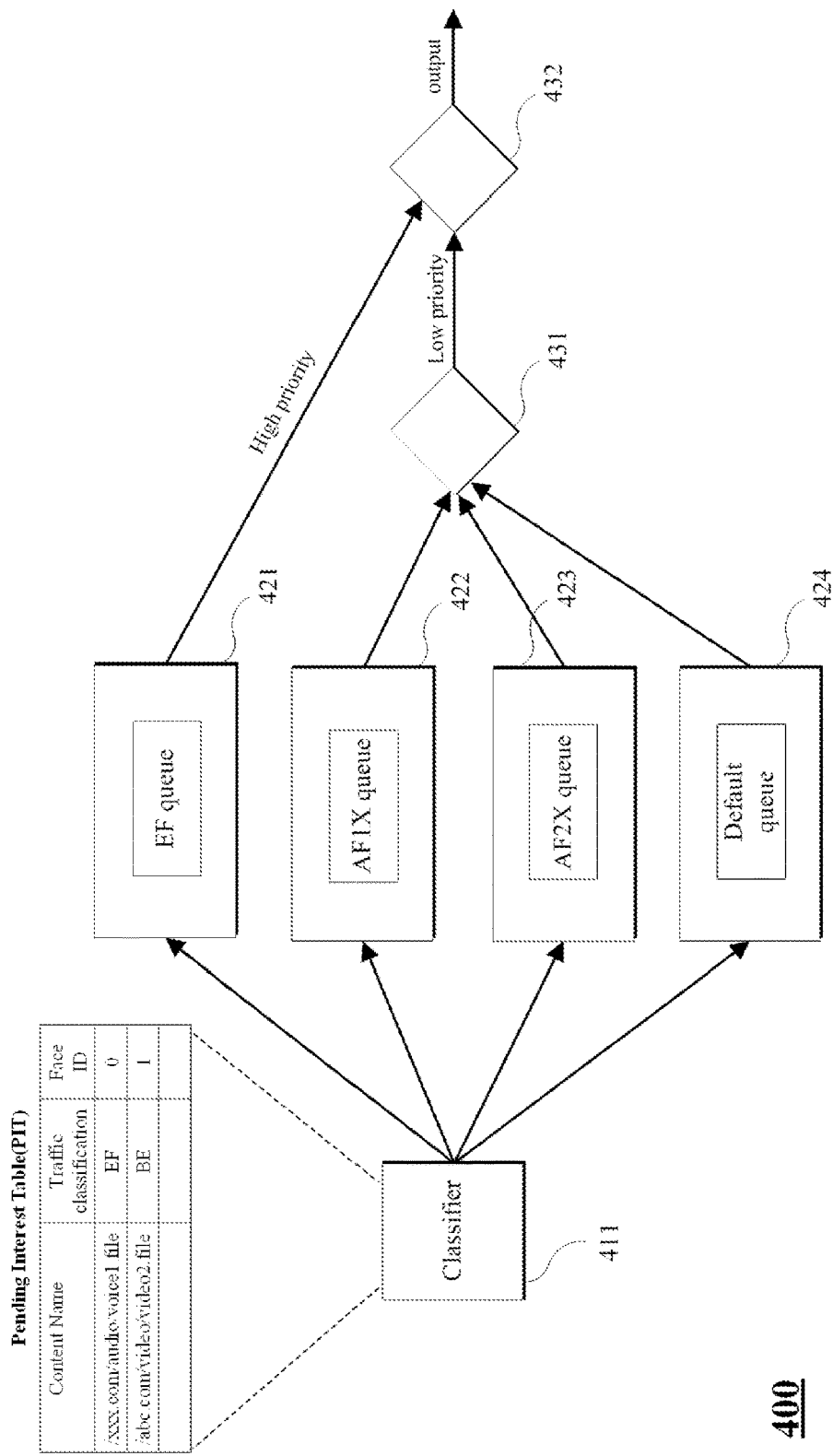
FIG. 7 is a diagram illustrating an example that a differentiated service router provides a differentiated service on the basis of traffic class information in content centric networking.

FIG. 7 is a diagram illustrating an example that a differentiated service router 400 provides a differentiated service on the basis of traffic class information in CCN. FIG. 7 illustrates an example of differentially transmitting a data packet in an approach using per-hop behavior by means of the differentiated service router 400. The differentiated service router 400 is the same as the differentiated service router 300 illustrated in FIGS. 3A and 3B and FIGS. 4A and 4B, indicated by a different reference numeral for clarity of explanation.

FIG. 7 illustrates the process performed by the differentiated service router 400 and some of the components in the differentiated service router 400. As described above, the differentiated service router 400 provides a differentiated service in a way similar to the IP DiffServ. Further, differentiated service router 400 uses various algorithms capable of selectively applying data transmission rates.

FIG. 7 illustrates a typical example of priority-based scheduling. In FIG. 7, the PIT is stored in a memory of the differentiated service router 400. A classifier 411 inserts a received specific data packet into a queue corresponding to traffic information, using a content name and traffic information stored in the PIT. In examples, the classifier 411 is implemented by a separate chipset with embedded software, or a process included in the differentiated service router 400 or a program stored in a memory.

Since there is a standard or a terminology defined and used for the differentiated service provided by CCN in the art, the classification terminologies used in the IP DiffServ are used in FIG. 7. For example, the term "Default Per-Hop Behavior (PHB)" or "Best Effort (BE) PHB" refers to a priority assigning the minimum resource, the term "Assured Forwarding (AF) PHB" refers to a priority divided into several classes according to an internal classification scheme, and the term "Expedited Forwarding (EF) PHB" refers to a priority for providing a high-quality service by assigning many resources. Those priority schemes are determined in advance on the basis of the identification information of a user, the identification information of a client device, a content name, and the type of data, in accordance with the method described above.

In the PIT illustrated in FIG. 7, the content name "/abc.com/video/video2.file" has traffic class information of BE PHB and the content name "/abc.com/video/video2.file" has traffic class information of EF PHB. Accordingly, when the differentiated service router 400 receives a data packet corresponding to the "/xxx.com/audio/voice1.file", it inserts the data packet into an EF queue 421. The data packet inserted in the EF queue is transmitted at a high priority to a queue 432 in accordance with the order of the EF queue and then transmitted to the next router through an interface 0 as provided in the PIT. Further, when the differentiated service router 400 receives a data packet corresponding to the "/abc.com/video/video2.file", it inserts the data packet into a default queue 424, and the data packet is sent through the queue 431 and the queue 432 in accordance with the ordering and then transmitted to the next router through an interface 1 as provided in the PIT.

The EF queue 421, AF1X queue 422, AF2X queue 423, and default queue 424 for the differentiated service, in various examples, potentially have different buffer magnitudes and queue magnitudes. The architecture and method for differentially transmitting a data packet in the context of FIG. 7 is achieved by various technologies.

Figure 8A:
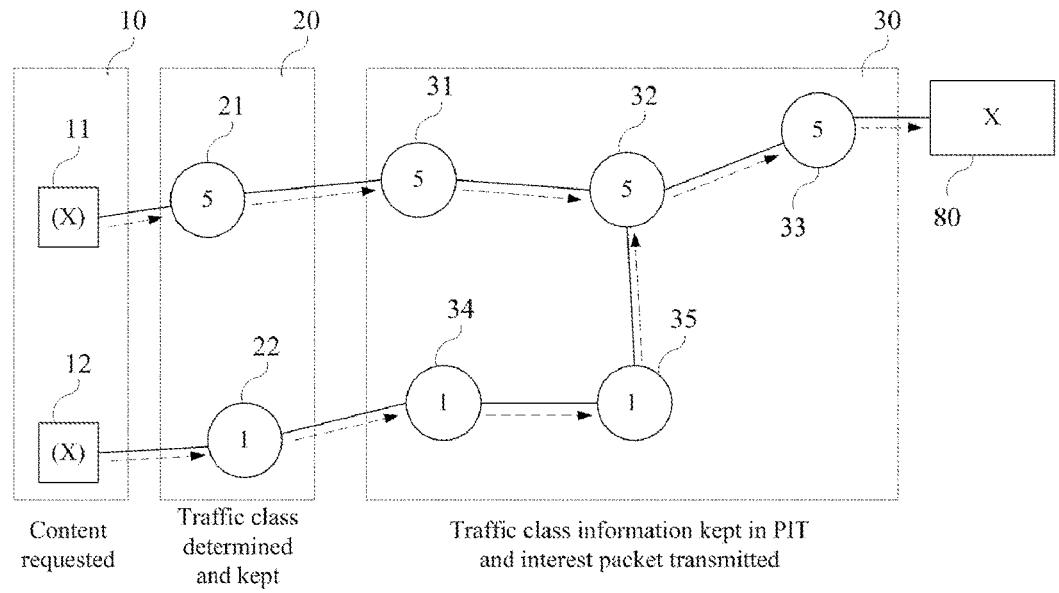
FIGS. 8A and 8B are diagrams illustrating examples of a content centric networking system transmitting an interest packet for the same content with different priorities.
Figure 8B:
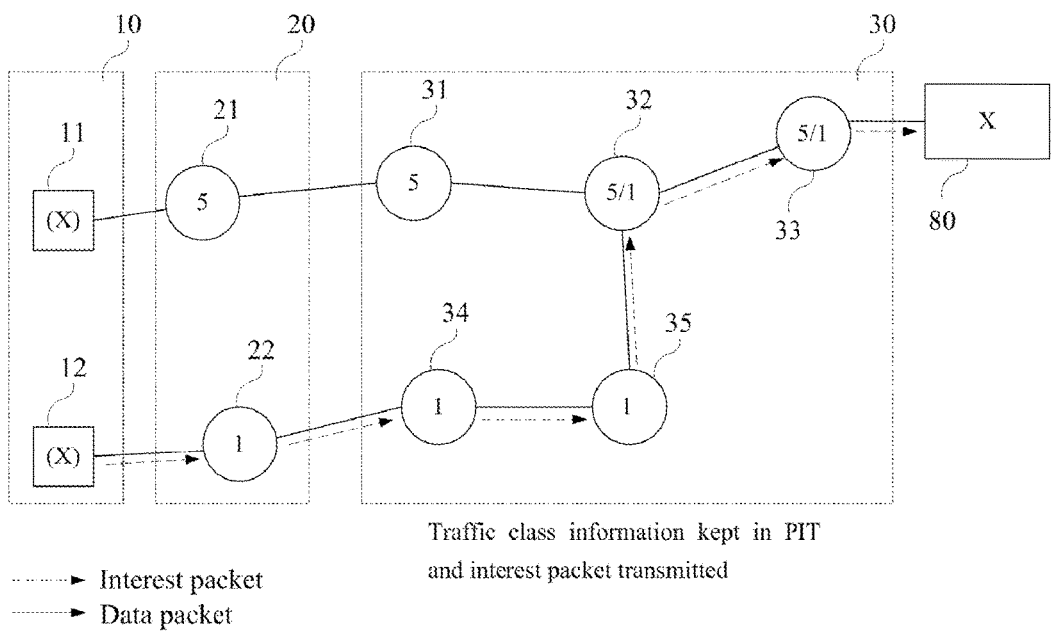

FIGS. 8A and 8B are diagrams illustrating examples of a CCN system 100 transmitting an interest packet for the same content with different priorities. FIGS. 9A and 9B are diagram illustrating examples information kept in a PIT managed by some of the differentiated service routers illustrated in FIGS. 8A and 8B.

In CCN of the related art, a router did not need to transmit an interest packet any further, when there is an interest packet having the same name in its PIT. However, the CCN system 100 providing a differentiated service is different from these other techniques of CCN, because there are priorities for interest packets which affect when it is necessary to transmit an interest packet.

For example, two cases affect when it is necessary to transmit an interest packet. First, in one case, there is a priority for the same content having the same content name as that of the current received interest packet in a PIT of a specific router, and the priority of a new received interest packet is the same as or lowers than that of a content name existing already in the PIT, which is considered as a first case. Second, in another case, the priority of the current received interest packet is higher than that of the same content name existing already in a PIT, which is considered as a second case.

In the first case, a router, such as a differentiated service router and/or an edge router, stores the priority and an interface of a new received interest packet in its PIT and does not transmit an interest packet any further.

However, in the second case, a router, such as a differentiated service router and/or an edge router, stores the priority and an interface of a new received interest packet in its PIT and also transmits the new interest packet to the next router. For example, even the interest packet pertains to the same content, when a user having a higher priority requests the content, the content server makes data packets for quick transmission from all of routers in order to satisfy the demand of the user having a higher priority.

When there is a content name that is the same as the content name included in an interest packet is already in a PIT and the traffic class information included in the interest packet has a priority higher than that of the traffic class information corresponding to the content name already existing, the differentiated service routers 30 can transmit the interest packet to the next final service routers 30 or the content server 80 in the path reaching the content server.

In FIG. 8A, it is assumed that a client device 11 has requested a content X first and has transmitted an interest packet X to the content server 80. Accordingly, all the routers 21, 31, 32, and 33 in the paths reaching the content server 80 from the client device 11 have stored a priority of 5 for the interest packet X created by the client device 11 in their PITs. In this case, a client device 12 has requested the same content X and the interest packet X requested by the client device 12 has a priority of 1. It is assumed that the priority of 1 is higher than the priority of 5. Here, a priority value that is numerically smaller is treated as being of greater importance. That is, the priority of the interest packet X requested by the client device 12 is higher than the priority of the interest packet X requested by the client device 11.

In FIG. 8A, the interest packet X created by the client device 12 is transmitted to the router 32. In FIGS. 8A and 9A, it is assumed that the PIT of the router 32 is in the same state as that illustrated in FIG. 9A. That is, the router 32 stores the content name and the traffic class information of the interest packet X created by the client device 11 in its PIT.

In FIGS. 9A and 9B, router numbers are in parentheses in the interface field, and the router numbers are optional, but are presented for the convenience of description.

In the examples of FIGS. 9A and 9B, the router 32 has received an interest packet with a priority higher than that of the content X currently kept in its PIT. The router 32 stores the information about a new received interest packet in its PIT, regardless of the priority. FIG. 9B illustrates a PIT in which the information about an interest packet X created by the client device 12 has been marked, with the information about the interest packet X, which has been created by the client device 11, stored therein. Referring to FIG. 9B, the content X has traffic class information of 5 and also traffic class information of 1, but these pieces of traffic class information are associated with different Face IDs. Thus, it is not directly associated with the priority to store the information about interest packets having the same content name in a PIT, and a given content name potentially is associated with different traffic classifications that are associated with different Face IDs. It is required, when a router receives content X corresponding to an interest packet X, to transmit a data packet to the routers 31 and 35 that have requested the content X, based on the PIT information.

Referring to FIG. 8B, the router 32 transmits the interest packet X created by the client device 12 to the next router 33.

Since the router 33 receives both the interest packet X created by the client device 11 and the interest packet X created by the client device 12 from the router 32, it has only one entry having the same Face ID for the content name X in its PIT and the traffic class information of the entry is changed from 5 to 1, because 1 is the highest priority.

To sum up, a router receives a first interest packet and keeps the first traffic information included in the first interest packet in its PIT. Thereafter, when it receives a second interest packet having the same content name as the content name included in the first interest packet that has traffic class information with a priority higher than that of the first interest packet, it keeps the second traffic information included in the second interest packet in the PIT and transmits the second interest packet to a content server. Thus, the edge routers 20 and the differentiated service routers 30 all perform the same operation.

Accordingly, the user using the client device 11 is provided with a quicker service than is inherently guaranteed for his/her priority at least through the path formed by the routers 32 and 33 and the content server 80. The effect that a user is provided with access to information provided by a service with a priority higher than his/her own actual priority is called free upgrading.

In examples, the service provider of CCN or the content provider determines whether to transmit an interest packet in the approach involving free upgrading that is illustrated in FIGS. 8A and 8B. Free upgrading can increase efficiency in terms of utilization of a network. However, in some examples, the content provider does not want to allow free upgrading for its contents. For example, if the content provider derives increased user fees when it provides a certain priority, free upgrading may lower the value of obtaining the actual, guarantee priority. In an example, the content provider concludes a service level agreement to allow only a single class for its contents or give content names to classes, and accordingly, it is possible to prevent such free upgrading.

Figure 10:
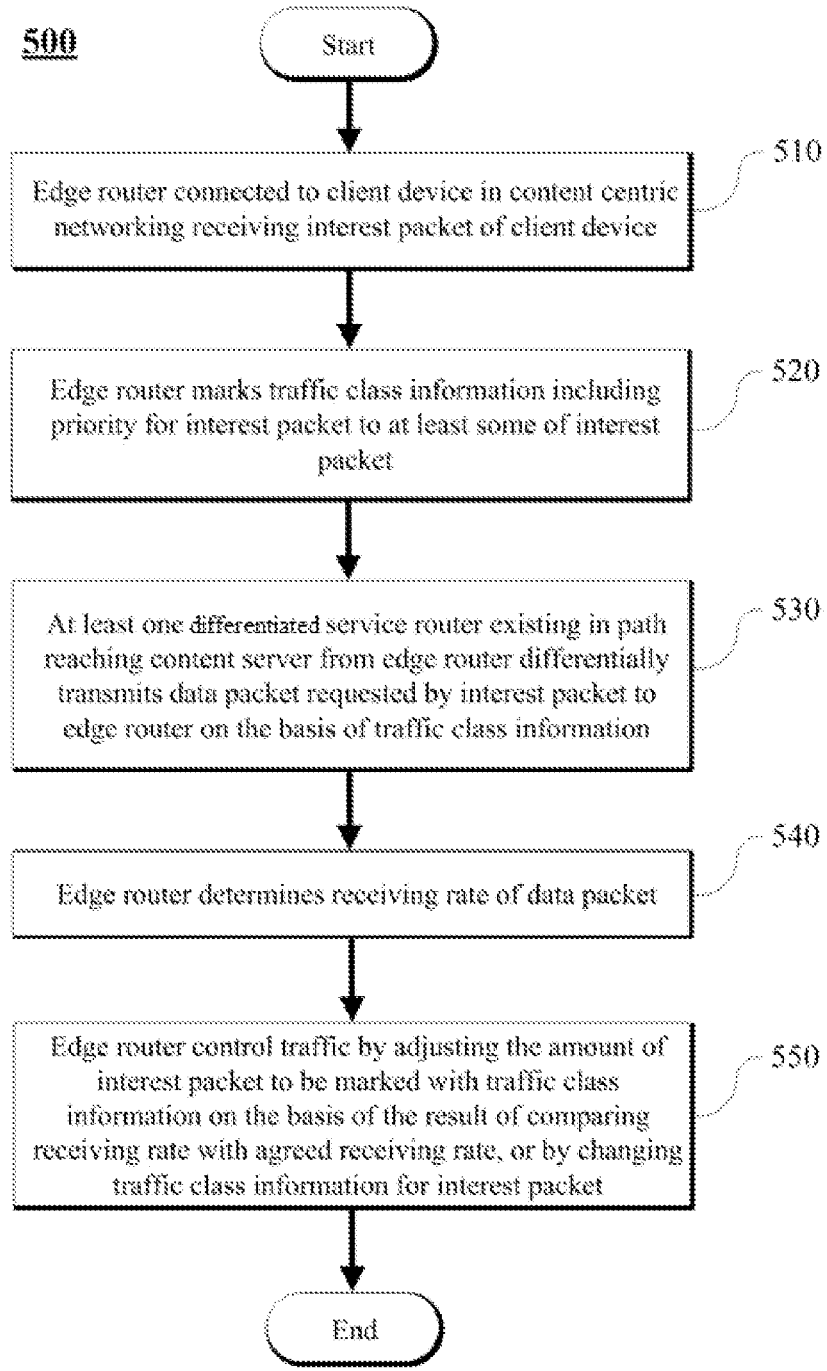
FIG. 10 is a flowchart illustrating an example of a method of controlling data traffic in content centric networking.

FIG. 10 is a flowchart illustrating an example of a method 500 of controlling differentiated data traffic in CCN. The control of differentiated data traffic in CCN is performed by the edge routers 20 that determine traffic class information for interest packets. The reference numerals given to components are not used in the following description of the method.

The method 500 of controlling different data traffic in CCN includes receiving an interest packet from a client device by means of an edge router connected to the client device in CCN at operation 510, performing traffic classification on the interest packets and marking corresponding class information to the interest packet by means of the edge router at operation 520, differentially transmitting a data packet requested by the interest packet to the edge router on the basis of the traffic class information by means of at least one differentiated service router in the path reaching a content server from the edge router in operation 530, determining a receiving rate of the data packet by means of the edge router 540, and controlling traffic by adjusting the amount of interest packet to be marked with the traffic class information, on the basis of a result of comparing the receiving rate with an agreed receiving rate, or changing the traffic class information of the interest packet, by means of the edge router in operation 550.

As described with reference to FIGS. 3A-3B, 4A-4B, and 5, the edge router determines and gives the traffic class information of the first received interest packet. In an example, the edge router gives traffic class information to all of received interest packets, but in another examples the edge router gives traffic class information only to a predetermined amount of interest packets of received interest packets.

In the description referring to FIGS. 3A-3B, 4A-4B, and 5 to 7, the edge router determines the priority of an interest packet and gives the traffic class information specifying the determined priority to the interest packet, and then another router receiving a data packet differentially transmits the data packet on the basis of corresponding traffic class information.

In the marking of corresponding class information in operation 520, the edge router adjusts the amount of interest packets to be marked with traffic class information. The edge router controls the amount of data packets to be received, by controlling the amount of interest packets marked with traffic class information.

The edge router adds the traffic class information of the first received interest packet and transmits it to another router. Thereafter, the edge router receives a data packet from the content server 80 or other routers 30.

In an example, the data packet received by a request of an interest packet has a fixed size of a data chunk, depending on the types of contents, or the size of data chunk is potentially not known in the earlier stages or it may be changed in accordance with circumstances.

When the size of a data chunk is considered, the edge router marks traffic class information only for a predetermined amount of interest packets and then transmits them. In an example, when the size of data chuck is not known or variable, the edge router marks traffic class information only to a predetermined amount of interest packets in accordance with a reasonable appropriate standard.

In the marking of corresponding class information at operation 520, the edge router determines and marks the amount of interest packets to be marked with traffic class information, to correspond to an agreed receiving rate. That is, in the marking of corresponding class information at operation 520, the edge router marks traffic class information only to the amount of interest packets from which data having a receiving rate that is close to the agreed receiving rate is expected. Further, in the marking of corresponding class information at operation 520, the edge router determines the amount of interest packets to be marked with traffic class information to a predetermined value and then marks the corresponding interest packets.

The edge router determines a receiving rate for the data packet corresponding to the interest packet at operation 540.

In one example, the edge router calculates a receiving rate for all data packets corresponding to interest packets for a reference period. Alternatively, in another example, the edge router calculates a receiving rate for data packets to be received in accordance with interest packets marked with traffic class information, for a reference period. In the latter example, the edge router calculates the receiving rate only for the received data packets due to interest packets marked with traffic class information.

The edge router controls the receiving rate of data packet that it currently receives, on the basis of a specific reference value. Hereafter, the specific reference value used to control such a receiving rate is referred to as an agreed receiving rate.

The agreed receiving rate is determined in various ways. In an example, the agreed receiving rate is determined to ensure a data receiving rate of 10 Mbps at the minimum for specific users under an agreement between the users and the service provider. By providing such an agreed receiving rate, it is possible to determine which steps are necessary to ensure that expectations for network performance are met.

In an example, the agreed receiving rate is used as a reference for determining traffic class information. As discussed, traffic class information helps govern when data packets are retransmitted and when they are not. Accordingly, in such an example, the agreed receiving rate is determined on the basis of at least one of a content name, the type of requested data, the identification information of a client device, and the identification information of the user who requests the service. As discussed above, such information helps to ensure that network traffic that is intended to have different priorities is properly prioritized.

For example, in a first approach, the agreed receiving rate is determined in accordance with an agreement or a contract between a service provider and a user who requests the service. That is, the service provider or company provides a service with a low data transmission rate to a user who prefers a cheap communication plan, or alternatively provides a service maintaining high data transmission rate to a user who selects an expensive communication plan. Thus, in such an approach, a user pays for improved service, and users designated for improved service have their network traffic prioritized. In this case, the edge router 200 uses the identification information of the service user in order to determine the agreed receiving rate.

In a second approach, the agreed receiving rate is determined in accordance with the client device requesting content, irrespective of a contract between a user and the service provider. In such an approach, the data transmission rate is associated with a requesting device, such that certain requesting devices are designated as having a higher priority. In such an example, the service provider provides a low data transmission rate for a service that is offered free at a public place or provides a high data transmission rate for devices associated with companies or other customers that have paid to have traffic for their devices to be prioritized. In this case, the edge router 200 requires the identification information about a client device in order to determine the agreed receiving rate.

In a third approach, the agreed receiving rate is determined on the basis of the content name requested by a user. That is, a service provider sets a predetermined data transmission rate in advance for specific content. In such an example, it is predetermined that certain data is to be prioritized and network traffic including that data is to be treated as being more important than other data that is considered to be less important. For example, a service provider maintains a transmission rate at a level capable to provide an appropriate service level for video contents that gain many views. In such an example, the provider maintains the transmission rate to ensure appropriate bandwidth for important content. Such an approach previous a satisfactory service while managing the load throughout the network by treating other content as less important. In this case, the edge router 200 requires a content name in order to determine the agreed receiving rate.

In a fourth approach, the agreed receiving rate is determined on the basis of the type of the content or data requested by a user. The type of content refers to the type of the data of a content or a file used for a specific application. For example, a text file is potentially designated as having a different priority than a video file. In this case, the edge router 200 requires the information about the type of a content or data in order to determine the agreed receiving rate.

In a fifth approach, further, the agreed receiving rate is not fixed or predetermined, but dynamic. For example, different agreed receiving rates are used for the same content name, depending on the charge, time, and network situation, in accordance with a choice by a user. Alternatively, a network service provider sets the agreed receiving rate dynamically to efficiently use the network resources, depending on the degree of congestion of the network. When it is dynamic, the term "agreed receiving rate" is used to refer to the fact that the service provider and the user both accept the validity of a dynamic agreed receiving rate, even though the rate is not previously "agreed" upon, but a dynamic agreed receiving rate corresponds to a similar receiving rate determine by a contract or an agreement between a user and the service provider, so a "dynamic agreed receiving rate" uses similar terminology.

In the controlling of traffic at operation 550, when the receiving rate exceeds the agreed receiving rate, the edge router reduces the amount of interest packets to be marked with traffic class information in proportion to the degree of excess. Further, when the receiving rate is lower than the agreed receiving rate, the edge router increases the quantity of interest packets to be marked with traffic class information, in proportion to the degree of deficit.

The edge router controls an expected receiving rate by reducing the amount of packets to be marked with traffic class information in the received interest packets. For example, when traffic class information is currently marked to a number $c1$ of pieces of interest packets per second and is not marked to a number $c2$ of pieces of interest packets, the edge router controls the receiving rate of data packets by adjusting the number of interest packets that are to be marked with traffic class information per second.

Further, the edge router controls an expected receiving rate using an approach of discarding some of the received interest packets.

Further, in an example, when the receiving rate exceeds the agreed receiving rate, the edge router lowers the priority included in the traffic class information in proportion to the excess amount. For example, when the priority given to the first interest packet X is AF1 and the current receiving rate exceeds the agreed receiving rate, it is possible to give a priority of BE or Default to the interest packet X. For example, the level difference between the first given priority and another priority used for control depends on the difference between the receiving rate and the agreed receiving rate.

Further, in this case, the edge router adjusts the amount of interest packets to be marked with traffic class information having a low priority in accordance with the degree of excess. For example, the edge router gives AF1 priority to some of interest packets X and BE to others.

To sum up, the edge router controls the receiving rate of data packets by changing at least one of the amount of interest packets, the amount of interest packets to be marked with traffic class information, and traffic class information to be marked to interest packets, or through combinations of at least two of these factors on the basis of the receiving rate of data packets corresponding to the interest packets as the data packets are transmitted and received.

Figure 11:
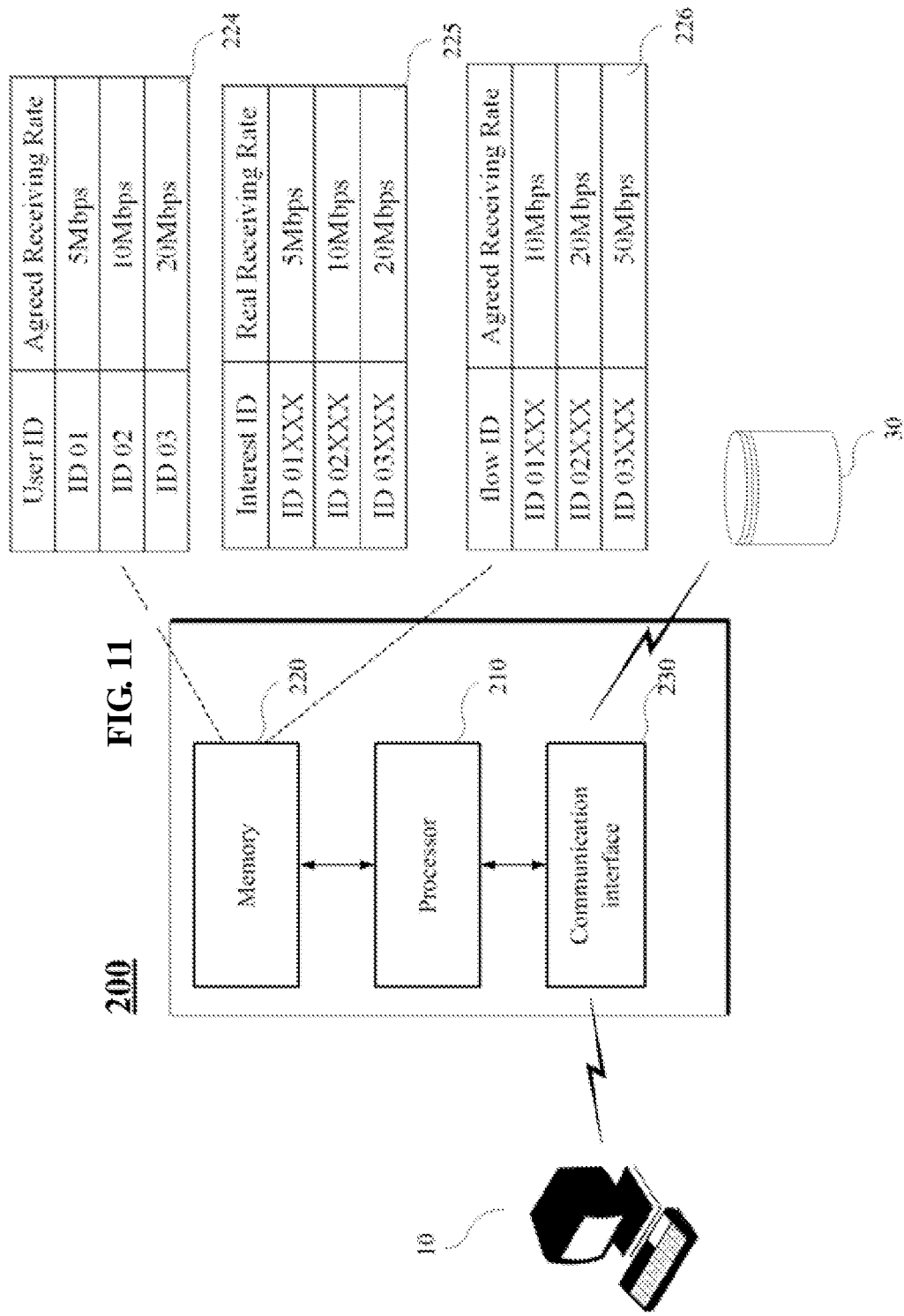
FIG. 11 is a block diagram illustrating an example of the configuration of an edge router for traffic classification.

FIG. 11 is a block diagram illustrating an example of the configuration of the edge router 200 for traffic classification. Features of the block diagram in relation to the method 500 of controlling data traffic in CCN are briefly described.

The edge router 200 for traffic classification includes a memory 220 that stores received rate standard information pertaining to an agreed receiving rate for interest packets, a processor 210 that adds first traffic class information including priorities of interest packets, which are determined on the basis of at least one of traffic standard information and the reception standard information received from a client device, to at least some of the interest packets, and that adjusts the amount of interest packets to be marked with traffic class information on the basis of the result of comparing the agreed receiving rate with the receiving rate of data packet requested by the interest packets or controls traffic by changing the traffic class information of the interest packets, and a communication interface 230 for communication with the next router existing in paths reaching between the client device and a content server. Thus, the configuration of the edge router 200 illustrated in FIG. 11 is the same as that illustrated in FIG. 5. Hence, description provided for the edge router 200 illustrated in FIG. 5 generally pertains to description provided for the edge router 200 of FIG. 11.

The memory 220 includes the information on the agreed receiving rate. An agreed receiving rate table 224 illustrating the receiving rate standard information for agreed receiving rates is illustrated at the right side in FIG. 11. FIG. 11 illustrates an example of using different agreed receiving rates, depending on the identification information of users. For example, the agreed receiving rate of a user whose ID is ID 01 is 5 Mbps and the agreed receiving rate of a user whose ID is ID 03 is 20 Mbps.

The processor 210 determines an agreed receiving rate for the current received interest packet on the basis of the interest packet or the identification information of a user which is separately transmitted.

As described above, it is possible to determine the agreed receiving rate on the basis of another receiving rate standard information. Thus, the processor 210 determines an agreed receiving rate on the basis of at least one of a content name, the type of requested data, the identification information of a client device, and the identification information of the user who requests the service.

The processor 210 determines the amount of interest packets to be marked first with traffic class information to corresponding to the agreed receiving rate. Further, the processor 210 marks first traffic class information only to a predetermined amount of interest packets.

The processor 210 determines a receiving rate of data packets as the amount of data packets received in accordance with interest packet marked with traffic class information for a reference period. Further, the processor 210 determines a receiving rate of data packet on the basis of the amount of all of data packets corresponding to the interest packet.

The receiving rate of data packets is stored on a specific memory location, such as a cache, to control the traffic. A data receiving rate table 225 storing receiving rates of data packets that were actually measured in the memory 220 is illustrated at the right side in FIG. 11.

The agreed receiving rate table 224 includes different agreed receiving rates depending on user's IDs. However, the agreed receiving rates are determined on the basis of a content name, the type of requested data, the identification information of a client device, and the identification information of the user who requests the service. Accordingly, the agreed receiving rates possibly depend on transmission characteristics pertaining to specific packets and the flow of such packets. Another agreed receiving rate table 226 is illustrated in consideration of this information at the right side in FIG. 11. In the agreed receiving rate table 226, the agreed receiving rates determined on the basis of the reference described above are provided in consideration of IDs for flow of packets.

When the receiving rate of data packets exceeds the contracted reception rate, the processor 210 reduces the amount of interest packets to be marked with traffic class information in proportion to the degree of excess.

When the receiving rate of data packets exceeds the agreed receiving rate, the processor 210 reduces transmitting the amount of interest packets in proportion to the degree of excess to the next router.

The processor 210 marks traffic class information with priority lower than that of the traffic class information, which was marked in the earlier stage, to interest packets in accordance with the degree of excess. Further, the processor 210 adjusts the amount of interest packets to be marked with traffic information with a low priority.

For example, when the receiving rate of a data packet requested by a user ID 02 whose agreed receiving rate is 10 Mbps is 15 Mbps on the average, an edge router reduces the amount of interest packets to be marked with traffic class information, discards some of the interest packets, or lowers the priority of the traffic class information to be marked to the interest packets so that an expected receiving rate of the data packet corresponds to the agreed receiving rate.

Alternatively, when the agreed receiving rate of a packet ID 01XXX is 10 Mbps but the receiving rate of the packet is 15 Mbps on the average, an edge router controls the current or expected receiving rate of the packet to correspond to the agreed receiving rate.

Figure 12:
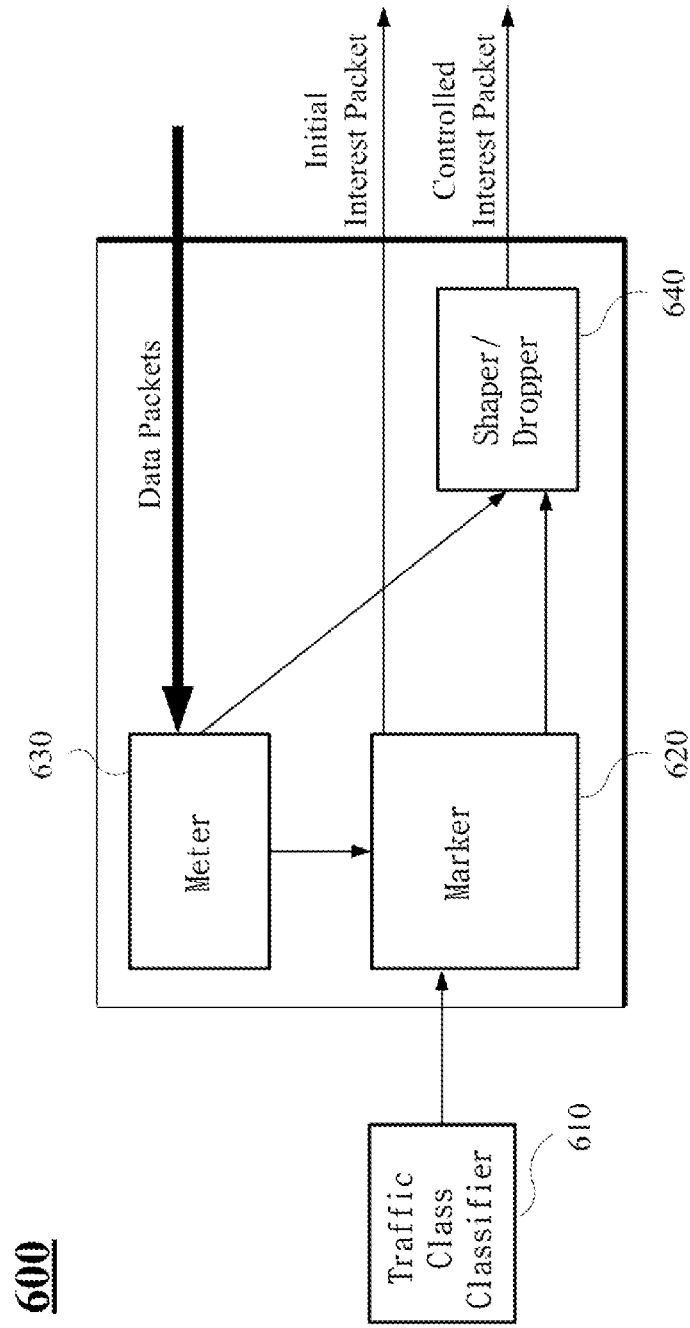
FIG. 12 is a block diagram illustrating an example of the functional configuration of the edge router for traffic classification.

FIG. 12 is a block diagram illustrating an example of the functional configuration of an edge router 600 for traffic classification. FIG. 12 illustrates a process of controlling traffic performed by a memory 220 and a processor 210 of an edge router 200 for traffic classification, presented in a functional block diagram. In an example, the blocks illustrated in FIG. 12 are implemented by separate chipsets, but correspond to the functions performed by a common processor 210.

A traffic class classifier 610 is provided to perform traffic classification on interest packets in the edge router. A marker 620 is provided to mark traffic class information determined by the traffic class classifier 610 to interest packets. The marker 620 marks traffic class information to at least some of interest packets in accordance with an agreed receiving rate of interest packets. When the size of data chunk of data packets is fixed, the marker 620 marks traffic class information to a predetermined amount of interest packets in consideration of the size of data chunk and the agreed receiving rate.

An initial interest packet marked with traffic class information is transmitted to the next router. Thereafter, when a meter 630 tracks the data packet corresponding to the interest packet transmitted from the edge router 600, the meter 630 determines a receiving rate for the data packet.

In the example of FIG. 6, the marker 620 reduces the amount of interest packets to be marked with traffic class information, when the receiving rate of the data packet exceeds the agreed receiving rate, on the basis of the result of comparing the receiving rate of the data packet with the agreed receiving rate. Alternatively, the marker 620 does not set a priority of traffic class information to be marked to an interest packet, or reduces the priority and then marks it as an attachment to an interest packet. Other routers 30 receiving the data packet insert a data packet corresponding to an interest packet without a priority into a default queue as illustrated in FIG. 7.

A shaper/dropper 640 is provided to control the transmission rate of interest packets. In the example of FIG. 6, a shaper and a dropper perform separate functions. For example, when the receiving rate of a data packet exceeds an agreed receiving rate, the shaper delays and transmits an interest packet and the dropper abolishes an interest packet in accordance with the degree of excess. Thus, the shaper/dropper 640 controls the transmission rate of interest packets, but the shaper part and the dropper part do so in different ways.

In FIG. 12, although the function of the edge router 600 for traffic classification is illustrated in a block diagram, but this diagram basically corresponds to the same functionality of the edge router 200 for traffic classification illustrated in FIG. 11.

As set forth above, according to examples, the examples described above provide a differentiated data transmission service in accordance with users or the types of services in CCN. Accordingly, the example described above can differentially transmit data in accordance with requests from a content user, a content provider, and a network provider while overcoming the problem of inefficient repeated transmission of data in an IP-based network.

Further, the examples described above provide a more expandable differentiated service by classifying and adjusting traffic for a differentiated service to more effectively use, instead of a core router having a high load, an edge router having a relatively low load.

The examples described above effectively controls a specific service or data traffic to be received by users in accordance with a contract between the users, a service provider and/or a network provider in CCN capable of providing a differentiated service. Therefore, the examples described above implement differentiated service in the context of CCN, thereby providing the advantages of each networking approach while avoiding certain associated difficulties.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A content centric networking apparatus, comprising:
   an edge router configured to receive interest packets from a client device, and comprising a first processor configured to:
   determine traffic class information to mark the interest packets, and
   mark the interest packets with the determined traffic class information, wherein the traffic class information comprises priorities of the interest packets; and
   a differentiated service router configured to receive the interest packets from the edge router, and comprising a second processor configured to:
   store the traffic class information, marked at the interest packets in advance by the first processor, in a pending interest table, in response to receiving the interest packets marked with the traffic class information, determined in advance by the first processor, and
   differentially transmit data requested by the interest packets to the edge router, based on the traffic class information determined in advance by the first processor,
   wherein the edge router is configured to determine the traffic class information based on at least one of: a predetermined receiving rate of the data at the edge router, a content name, a type of requested data, identification information of the client device, identification information of a user of the client device, information of a point in time when a content is requested, or information of a charge on the user, and
   wherein the differentiated service router and the edge router are different devices.

2. The apparatus of claim 1, wherein the differentiated service router is configured to transmit the data by controlling per-hop-behavior, according to the traffic class information.

3. The apparatus of claim 1, wherein each interest packet of the interest packets comprises a first field for storing the traffic class information, and the pending interest table comprises a second field for storing the traffic class information.

4. The apparatus of claim 1, wherein the differentiated service router is configured to:
   receive a first interest packet, and
   store, in the pending interest table, first traffic information included in the first interest packet, and then
   in response to the differentiated service router receiving a second interest packet having the same content name as the content name included in the first interest packet, and having traffic class information with a priority higher than that of the first interest packet,
   store, in the pending interest table, second traffic information included in the second interest packet, and
   transmit the second interest packet to a content server.

5. The apparatus of claim 1, further comprising another differentiated service router comprising a processor configured to:
   receive a first interest packet marked with a first traffic class information from a neighbor router,
   receive a second interest packet marked with a second traffic class information from the same neighbor router or another neighbor router, and
   transmit data requested by the first or second interest packet to the neighbor router with a highest priority between the first interest packet and the second interest packet, if the second interest packet is received from the same neighbor router,
   transmit data requested by the first or second interest packet to each neighbor router based on priority of each class information, if the second interest packet is received from the another neighbor router.

6. The apparatus of claim 5, wherein the another differentiated service router is configured to transmit the second interest packet to an interface connected to a router in a path toward a content server, if only a second priority of the second class information is higher than a first priority of the first class information.

7. The apparatus of claim 5, wherein the another differentiated service router is configured to:
   store the first class information and an incoming interface in which the first interest packet is arrived,
   update the second class information if only a priority of the second class information is higher than a priority of the first class information, when the second interest packet is received from the same neighbor, and
   store the second class information and an incoming interface in which the second interest packet is arrived, if the second interest packet is received from another neighbor.

8. An edge router configured to receive interest packets from a client device in content centric networking, the edge router comprising:
   a processor configured to:
   determine traffic class information to mark the interest packets,
   mark the interest packets with the traffic class information, wherein the traffic class information comprises priorities of the interest packets, and
   control traffic, by adjusting an amount of the interest packets to be marked with the traffic class information, based on the result of comparing a receiving rate of data packets requested by the interest packets with a predetermined receiving rate, or by changing the traffic class information for the interest packets;
   a memory configured to store a pending interest table comprising content names included in the interest packets and information about interfaces receiving the interest packets; and a communication interface configured to communicate the traffic class information with a next router disposed in a path between the client device and a content server, wherein the processor is configured to determine the traffic class information, based on at least one of: a predetermined receiving rate of data at the edge router, a content name, a type of requested data, a client device identification information of the client device, identification information of a user who requests a differentiated service, information of a point in time when a content is requested, or information of a charge on the user.

9. A method to control data traffic in content centric networking to provide a differentiated service, the method comprising:
receiving interest packets from a client device, in an edge router connected to the client device in content centric networking;
using the edge router to:
  determine traffic class information to mark the interest packets, and
  mark the interest packets with the traffic class information, wherein the traffic class information comprises priorities of the interest packets;
differentially transmitting the data packets requested by the interest packets to the edge router, based on the traffic class information marked at the interest packets in advance by the edge router, by using a differentiated service router disposed in a path reaching a content server from the edge router;
determining a receiving rate of the data packets, in the edge router; and
using the edge router to control traffic, by adjusting a quantity of the interest packets marked with the traffic class information, based on the result of comparing the receiving rate with a predetermined receiving rate, or by changing the traffic class information about the interest packets.

10. The method of claim 9, wherein in the determining of a receiving rate, the edge router is configured to determine the receiving rate as a quantity of data packets received, based on the interest packets marked with the traffic class information received during a reference period.

11. The method of claim 9, wherein the predetermined receiving rate is determined, based on at least one of: a content name, a type of requested data, a client device identification information, identification information of a user who requests a differentiated service, information of a point in time when a content is requested, information of a charge on the user, and information about congestion in a network.

12. The method of claim 9, wherein in adjusting the quantity of the interest packets,
in response to the receiving rate exceeding the predetermined receiving rate, the edge router decreases the quantity of the interest packets to be marked with the traffic class information, in proportion to a first degree of the receiving rate exceeding the predetermined receiving rate, and
in response to the receiving rate being less than the predetermined receiving rate, the edge router increases the quantity of interest packets to be marked with the traffic class information, in proportion to a second degree of the receiving rate not exceeding the predetermined receiving rate.

13. The method of claim 9, wherein in adjusting the quantity of the interest packets, in response to the receiving rate exceeding the predetermined receiving rate, the edge router does not transmit the quantity of interest packets, in proportion to a degree of the receiving rate exceeding the predetermined receiving rate to a next router.

14. The method of claim 9, wherein in the changing the traffic class information, in response to the receiving rate exceeding the predetermined receiving rate, the edge router lowers the priority included in the traffic class information.

15. The method of claim 14, wherein the edge router is configured to determine the quantity of the interest packets to be marked with traffic class information having a same or a lower priority in accordance with a degree of the receiving rate exceeding the predetermined receiving rate.

16. An edge router configured to receive interest packets from a client device in content centric networking, the edge router comprising:
a memory configured to store receiving rate standard information about a predetermined receiving rate for the interest packets;
a processor configured to:
  mark the interest packets with traffic class information,
    wherein the traffic class information comprises: priorities of the interest packets determined, based on the receiving rate standard information and traffic standard information,
    wherein the traffic standard information comprises at least one of: a content name, a type of requested data, identification information of the client device, and identification information of a user who requests a differentiated service which are received from the client device with at least some of the interest packets, and
  control traffic, by adjusting an amount of the interest packets to be marked with the traffic class information, based on the result of comparing the predetermined receiving rate with a receiving rate of data packets requested by the interest packets, or by changing the traffic class information for the interest packets; and
a communication interface configured to communicate the traffic class information with a next router disposed in a path reaching the client device and a content server.

17. The edge router of claim 16, wherein the processor is configured to determine the predetermined receiving rate, based on at least one of: a content name, a type of requested data, a client device identification information, identification information of the user who requests the service, information of a point in time when a content is requested, information of a charge on the user, and information about congestion in a network.

18. The edge router of claim 16, wherein the processor is configured to determine the receiving rate of the data packets as an amount of data packets received, based on the interest packets marked with the traffic class information received during a reference period.

19. The edge router of claim 16, wherein the processor is configured to:
control the amount of the interest packets to be marked with the traffic class information, so that the receiving rate of the data packets corresponds to the predetermined receiving rate, or
adjust a priority included in the traffic class information.

20. A method to control data traffic in content centric networking to provide a differentiated service, the method comprising:

receiving interest packets from a client device, by an edge router connected to the client device in content centric networking;

using the edge router to mark at least one of the interest packets with traffic class information, wherein the traffic class information comprises priorities of the interest packets;

differentially transmitting data packets requested by the interest packets to the edge router, based on the traffic class information marked at the interest packets in advance by the edge router, by using a differentiated service router disposed in a path reaching a content server from the edge router;

using the edge router to:
- determine, based on an agreed receiving rate, a quantity of interest packets to be marked with traffic class information,
- mark the quantity of interest packets with corresponding traffic class information having a priority for the interest packets, and
- control traffic, by adjusting the quantity of the interest packets marked with the traffic class information, based on the result of comparing a receiving rate with the agreed receiving rate, or by changing the traffic class information about the interest packets.

* * * * *